Jan. 5, 1954

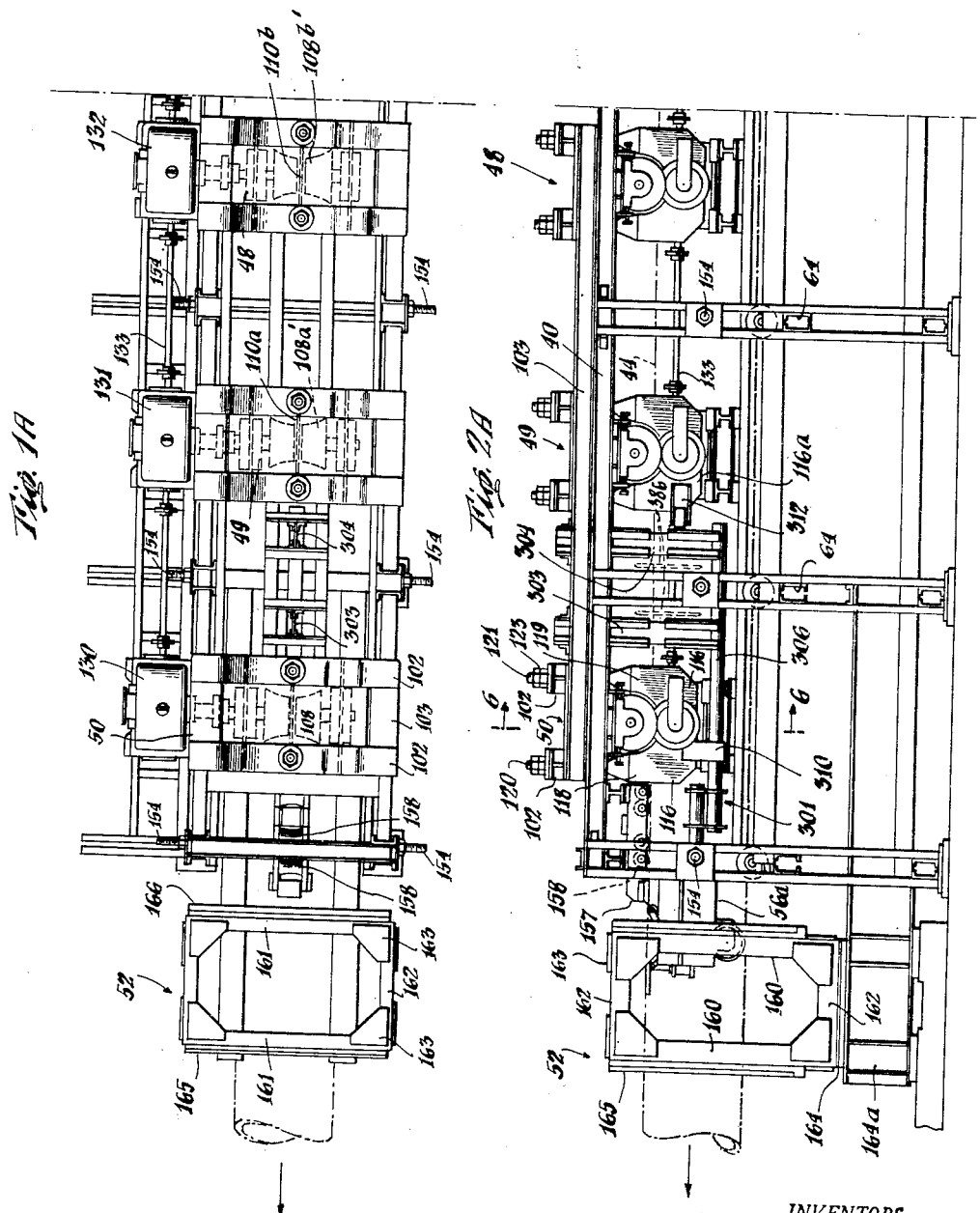

F. M. DARNER ET AL 2,665,362

MANUFACTURE OF PIPE

Filed June 14, 1949

INVENTORS
Frederic M. Darner
BY Walter J. Caine

Robert S. Dunham
ATTORNEY

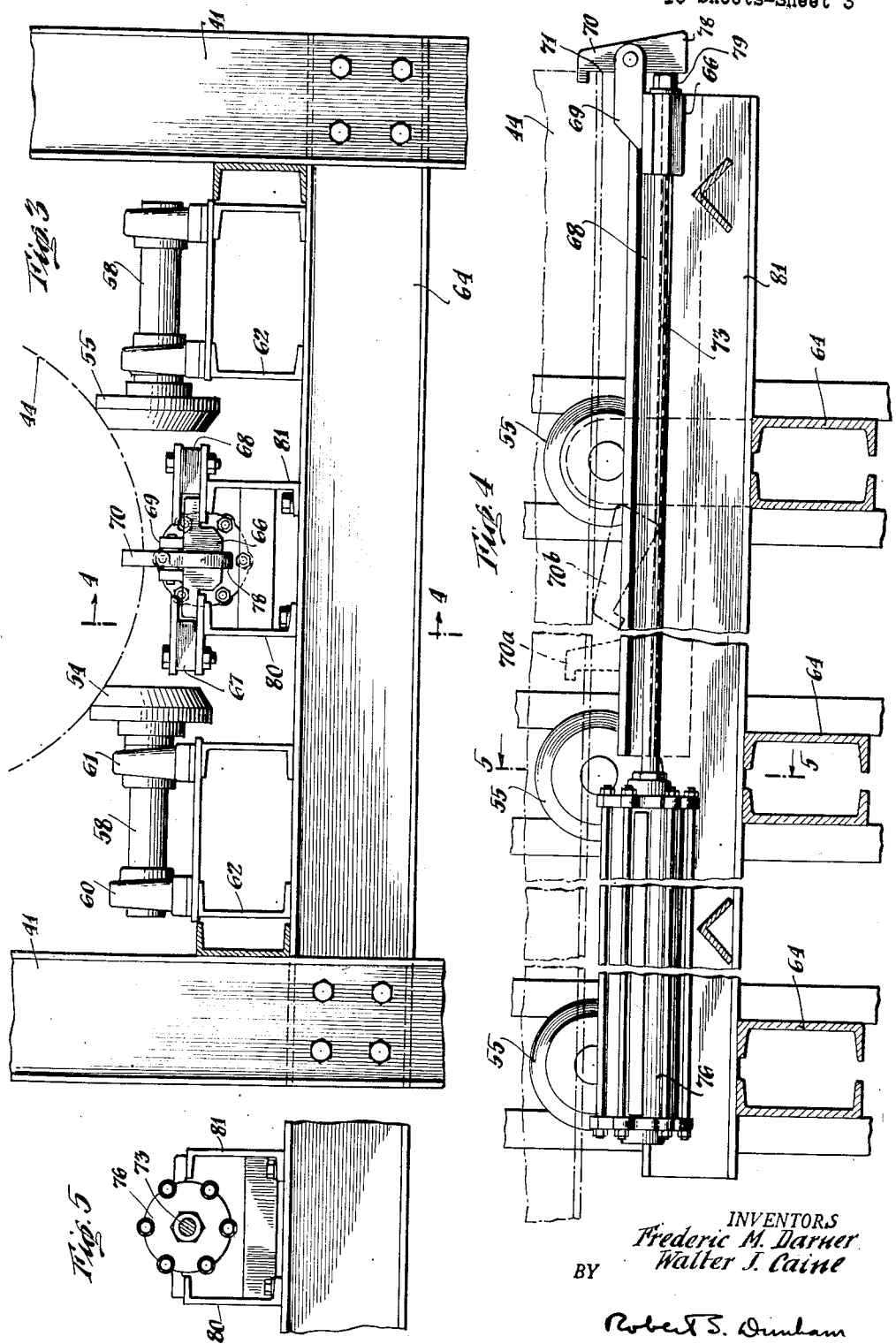

Jan. 5, 1954    F. M. DARNER ET AL    2,665,362
MANUFACTURE OF PIPE
Filed June 14, 1949    16 Sheets-Sheet 4
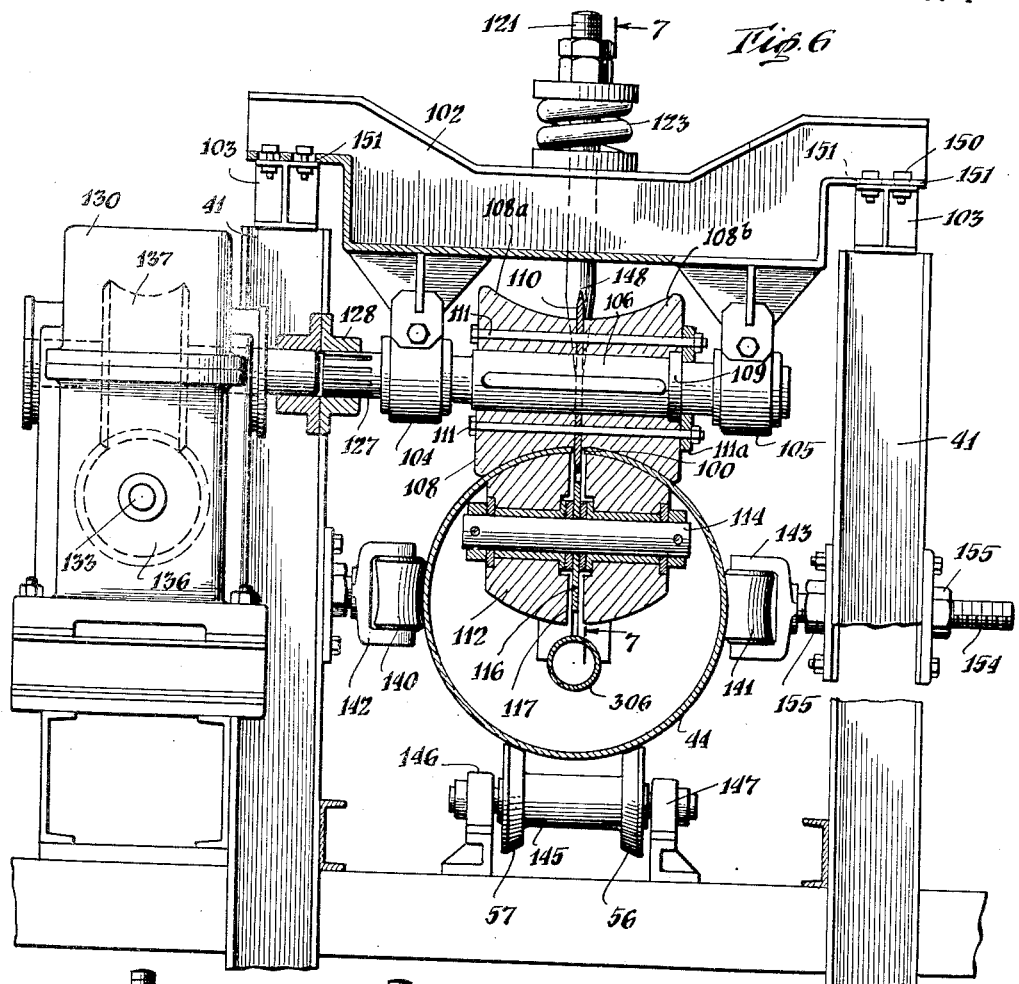
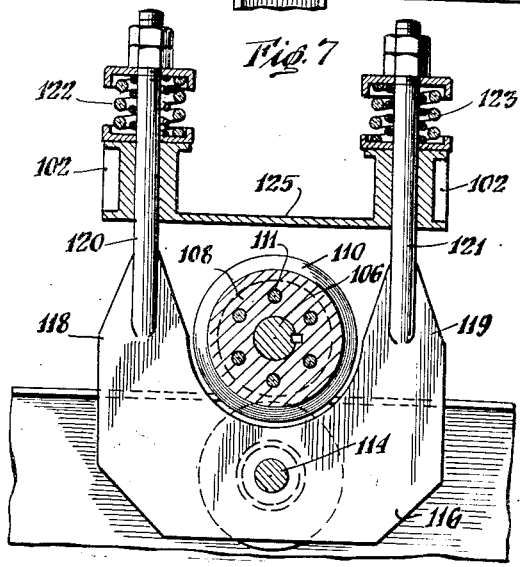
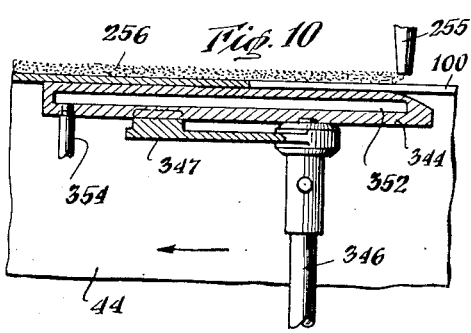
INVENTORS
Frederic M. Darner
Walter J. Caine
BY
Robert S. Dunham
ATTORNEY

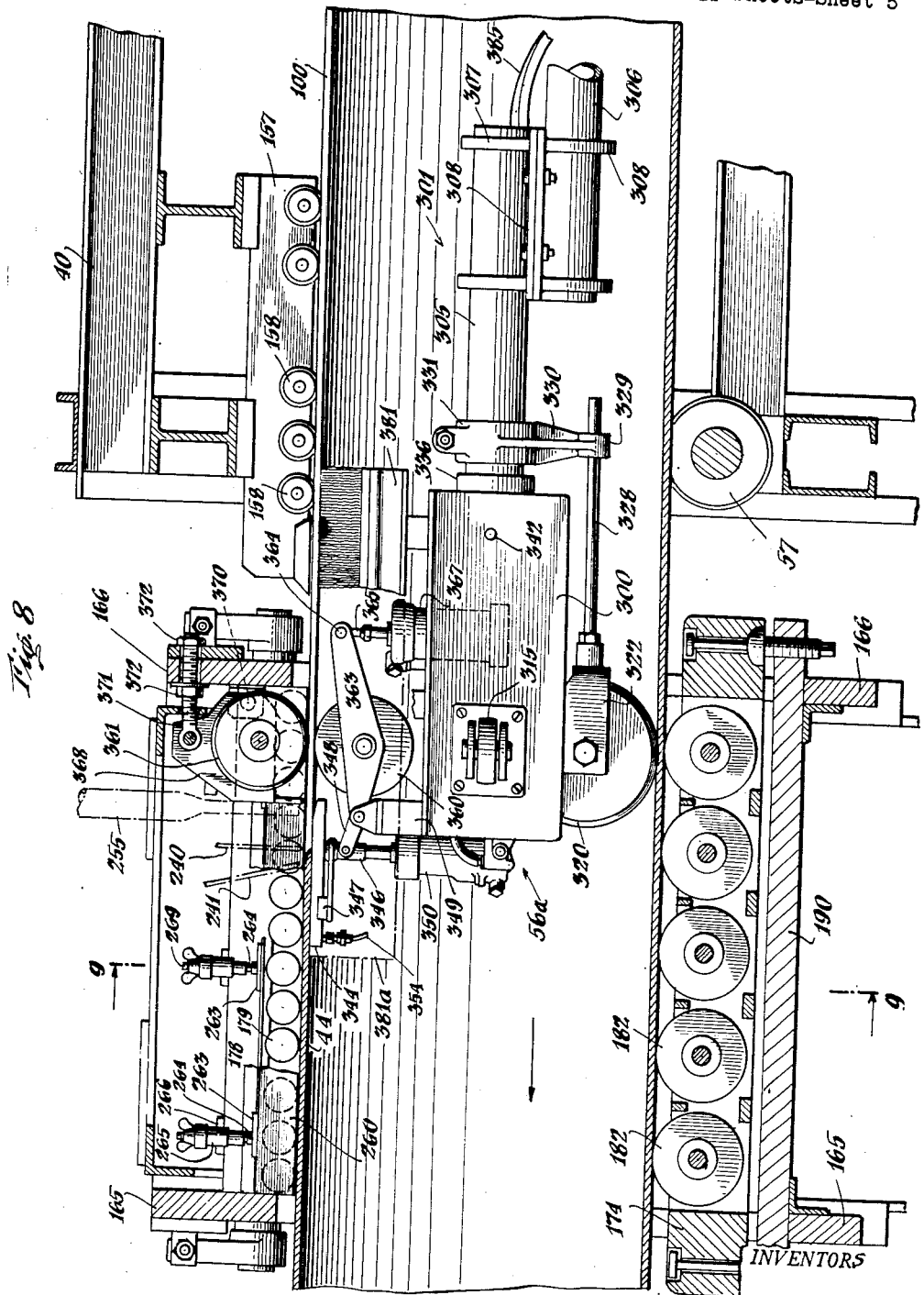

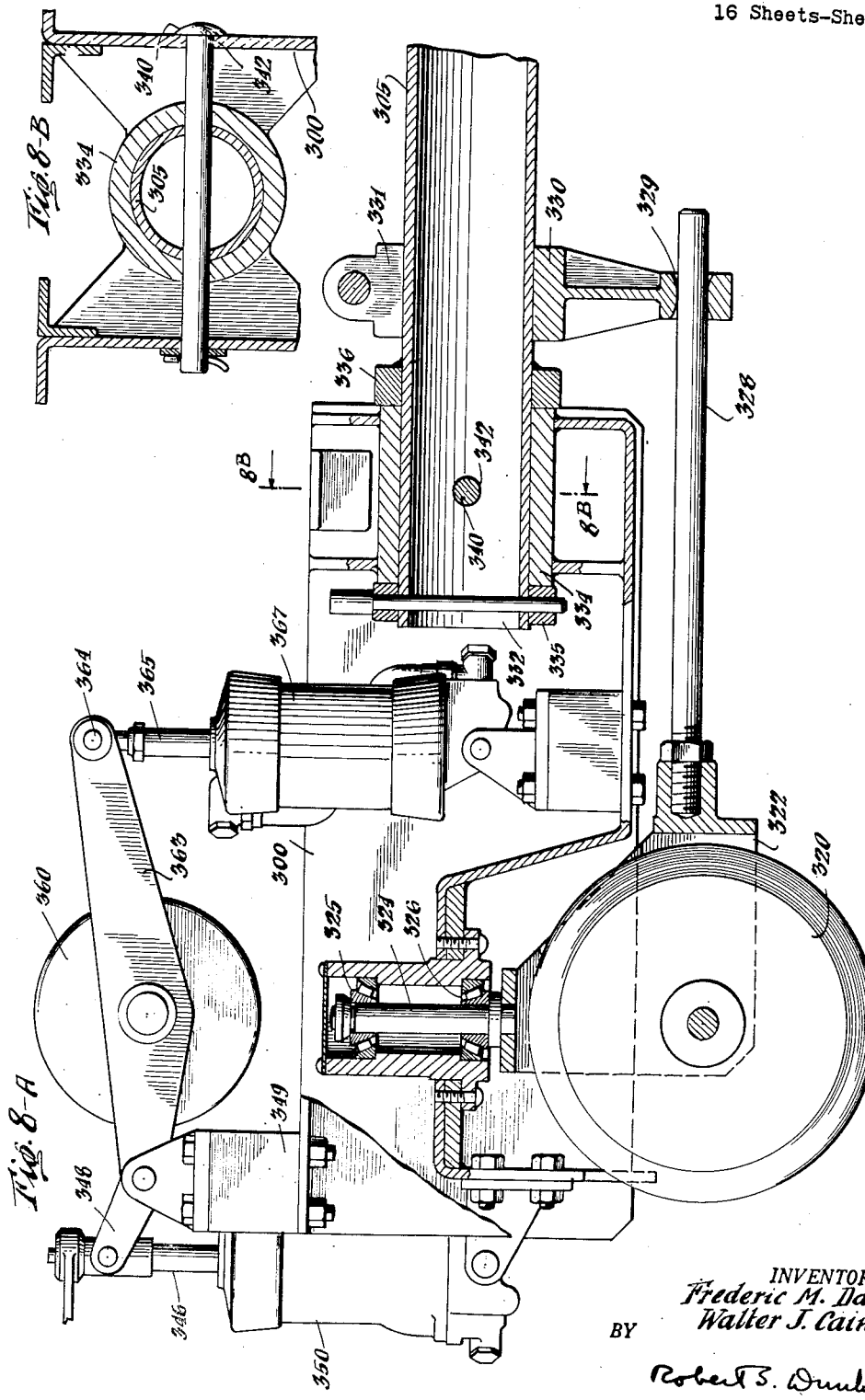

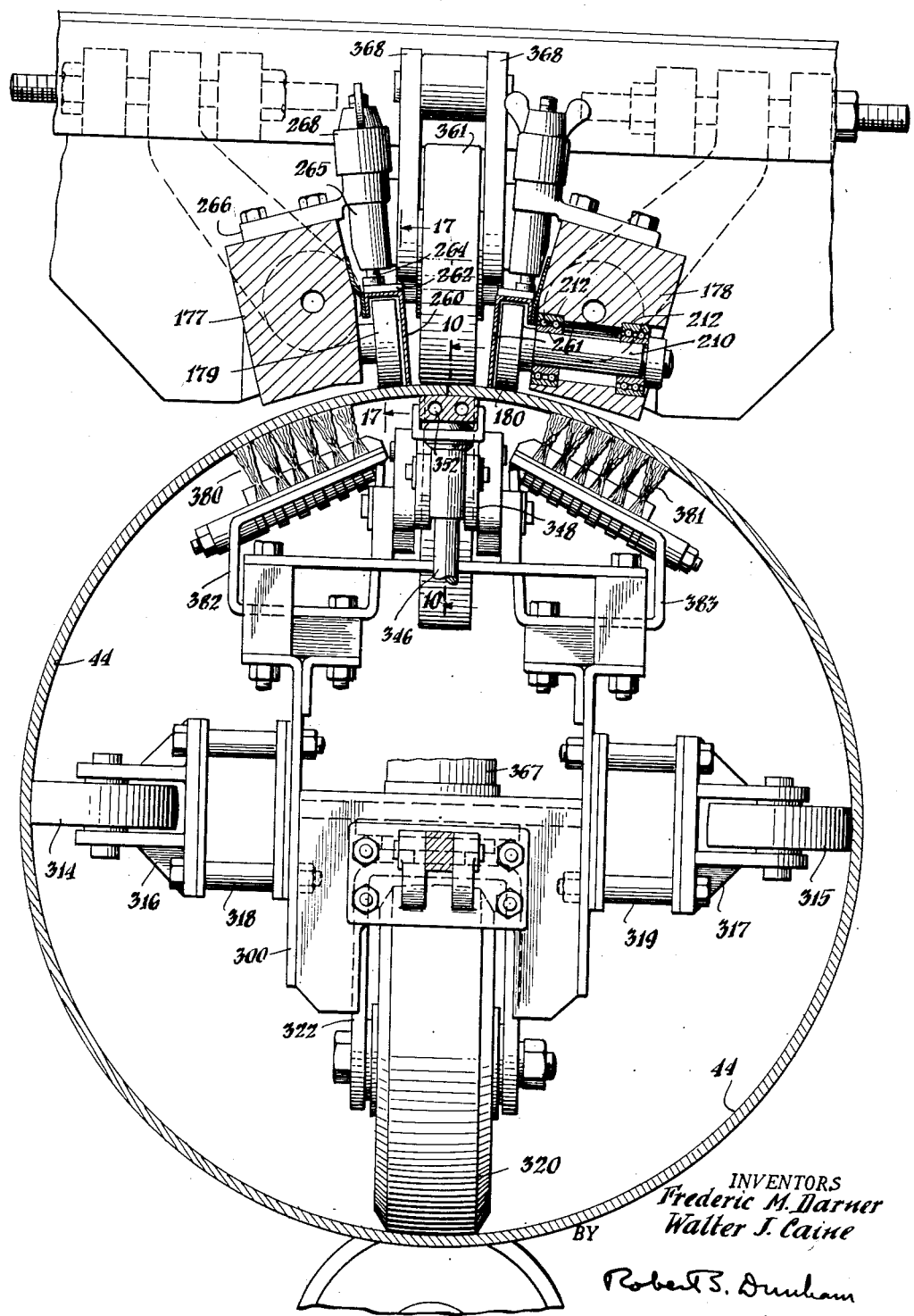

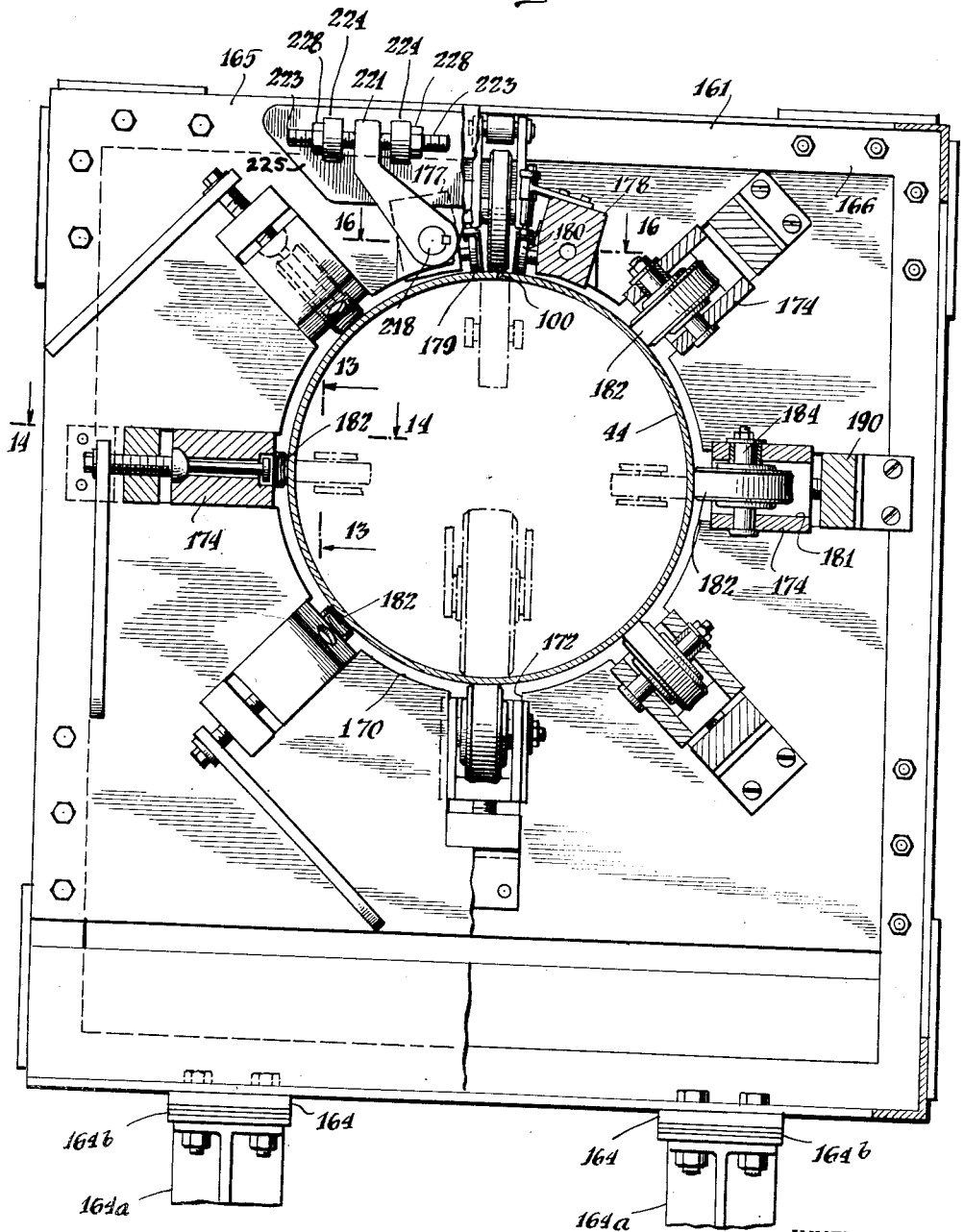

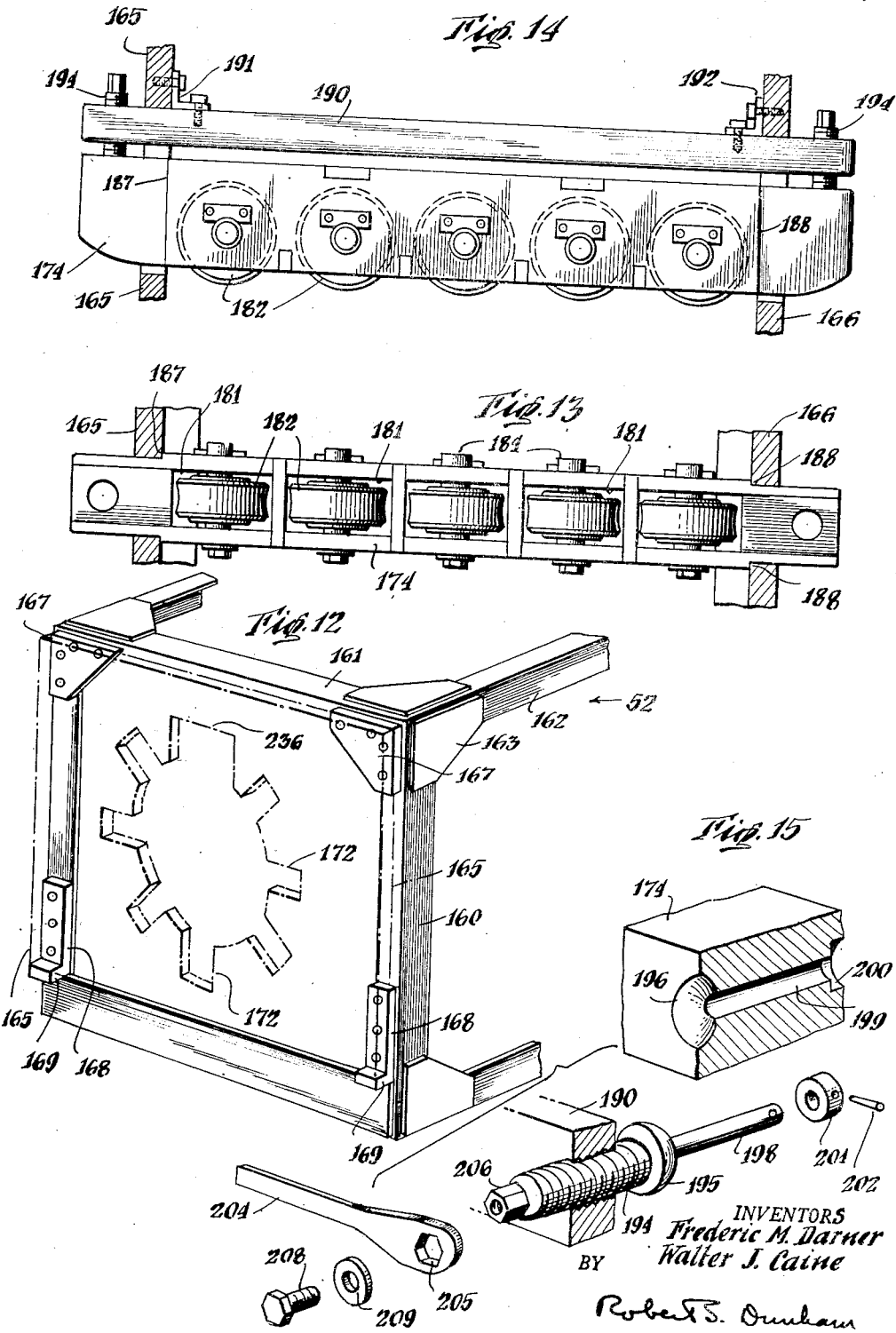

Jan. 5, 1954          F. M. DARNER ET AL          2,665,362
                      MANUFACTURE OF PIPE
Filed June 14, 1949                              16 Sheets-Sheet 10
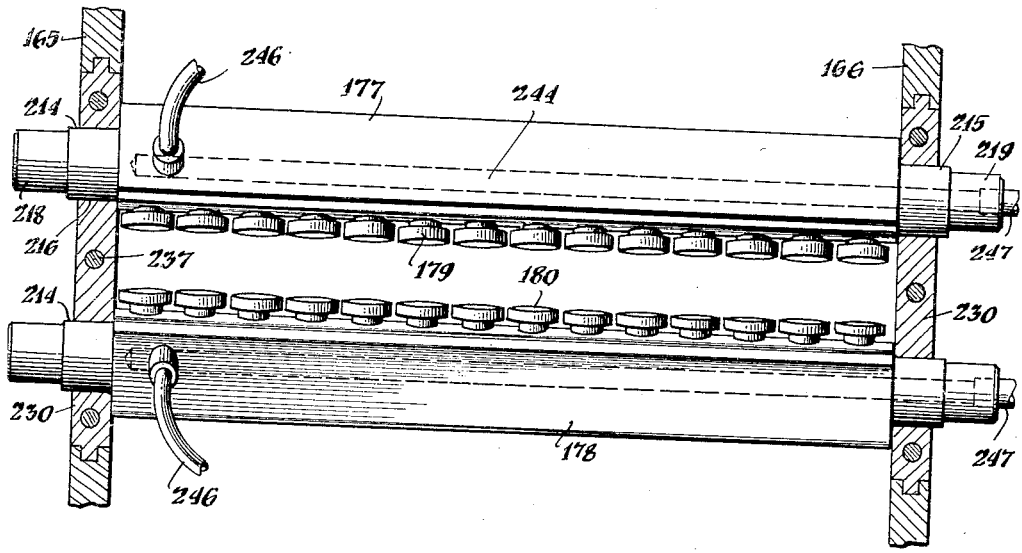
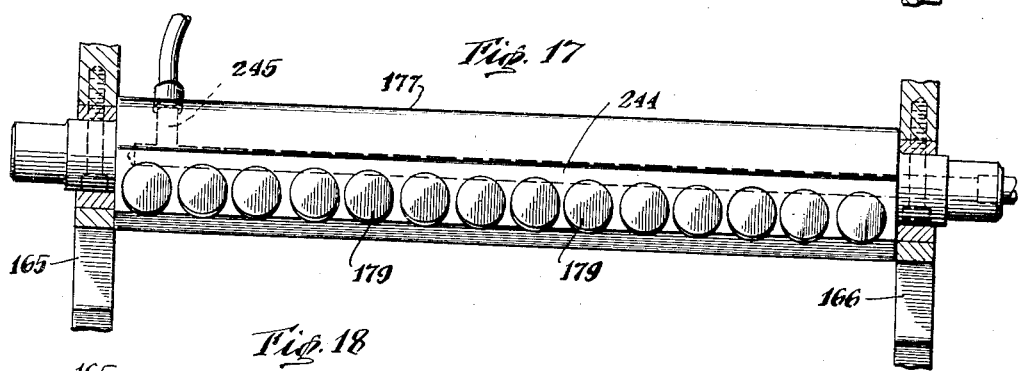
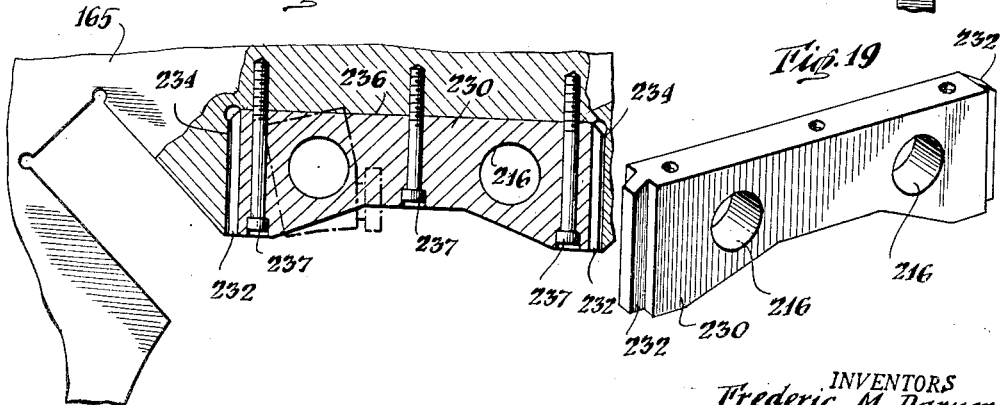
INVENTORS
Frederic M. Darner
Walter J. Caine
BY
Robert S. Dunham
ATTORNEY

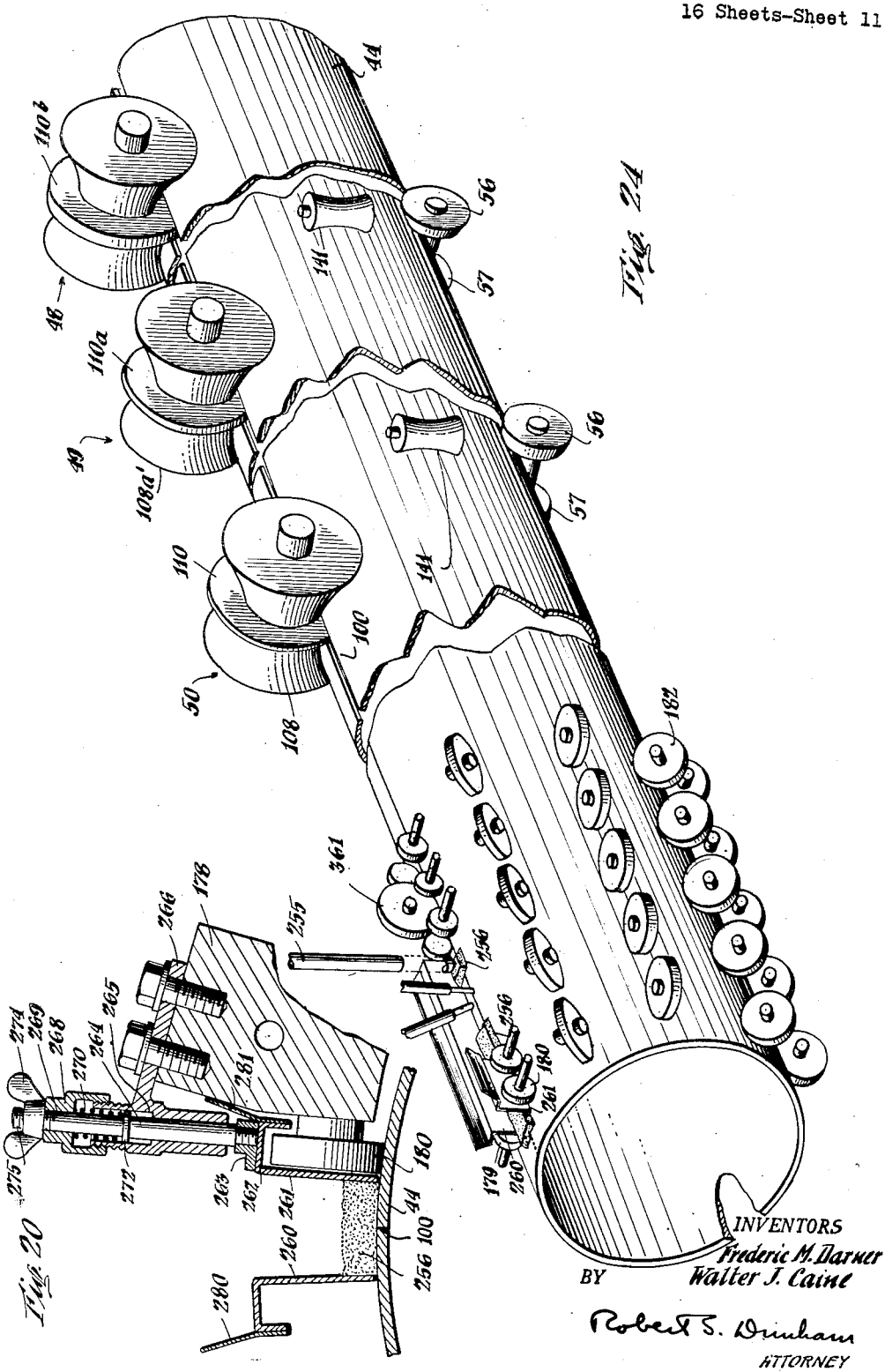

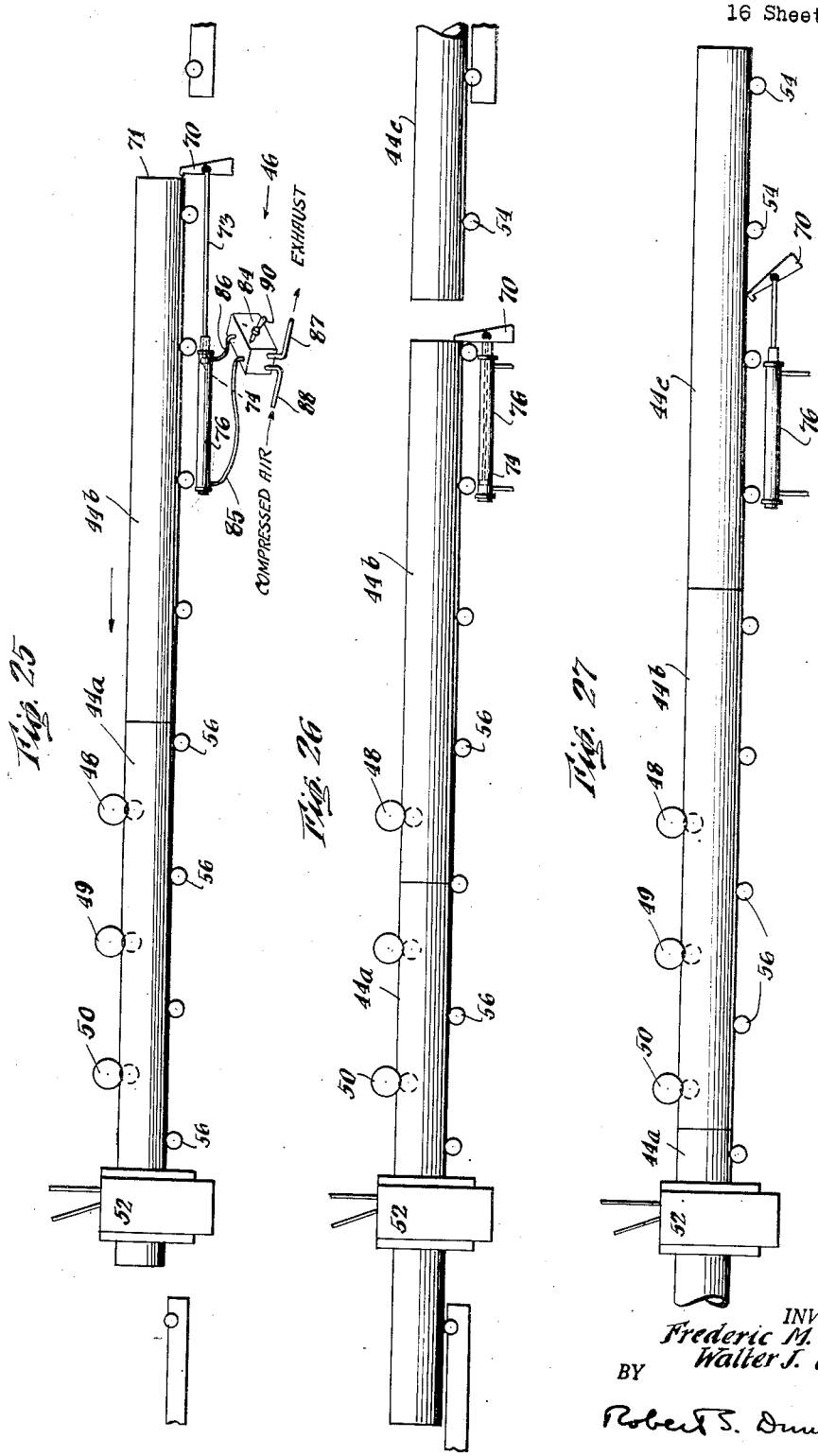

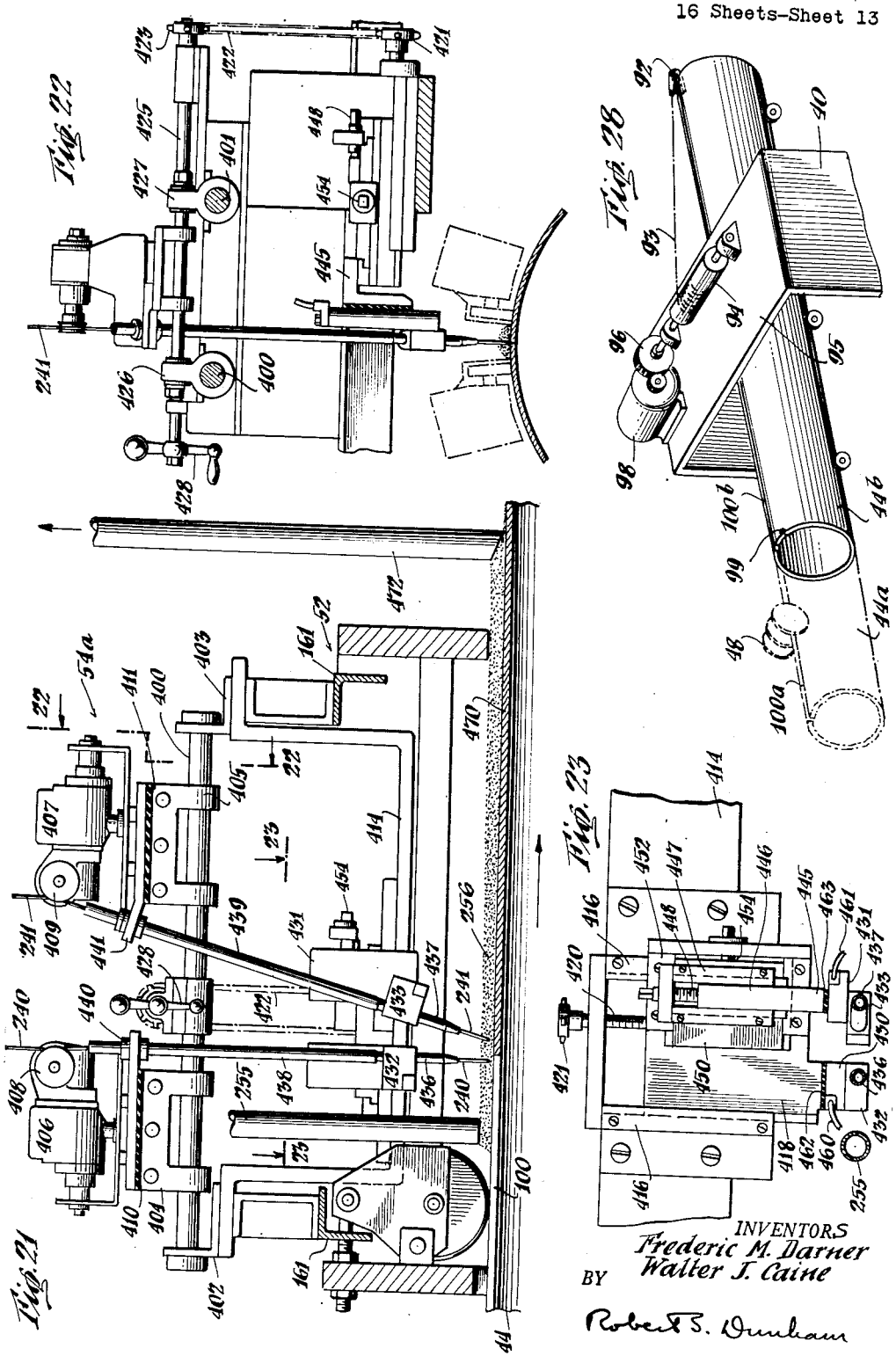

Jan. 5, 1954
F. M. DARNER ET AL
2,665,362
MANUFACTURE OF PIPE
Filed June 14, 1949
16 Sheets-Sheet 14
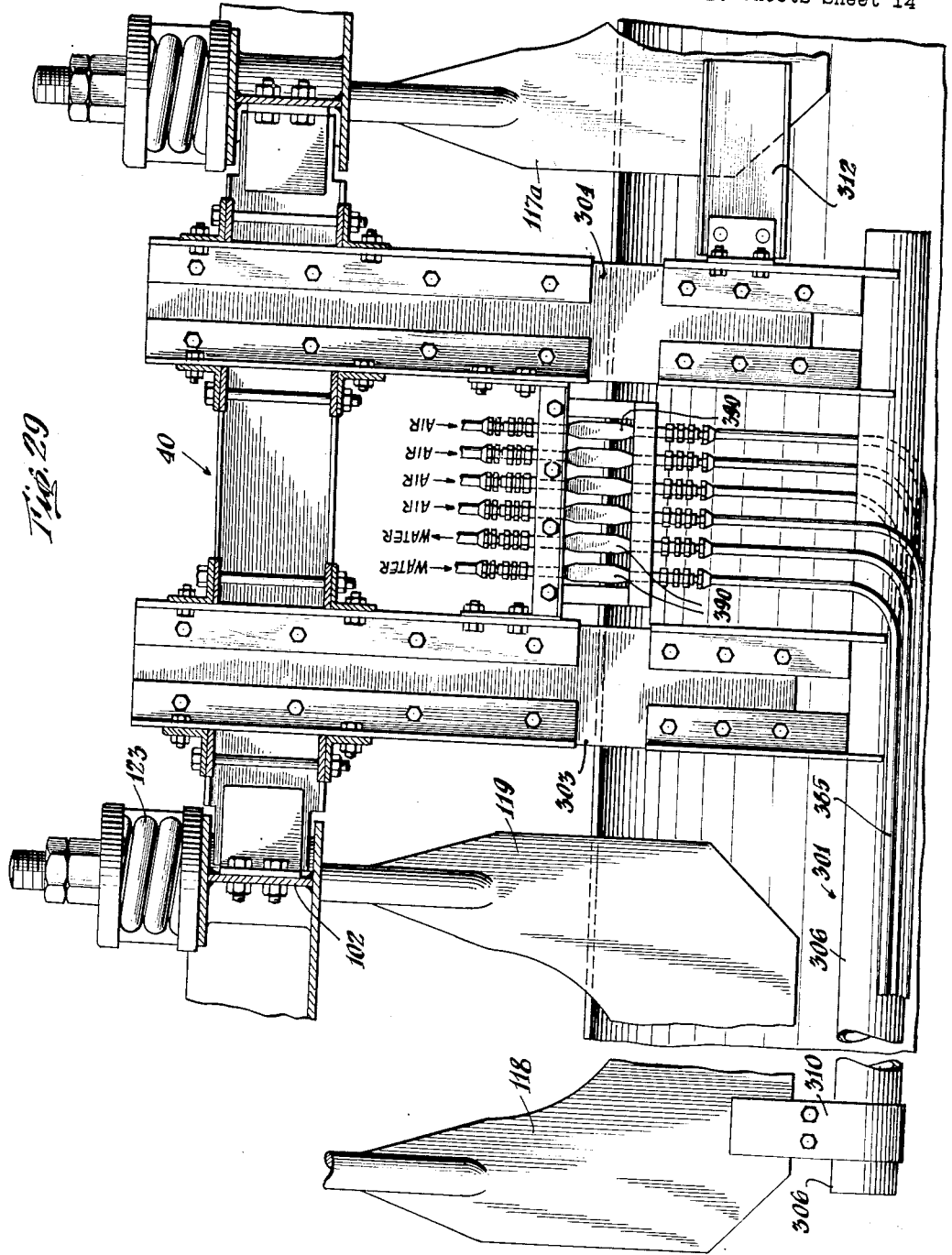
INVENTORS
*Frederic M. Darner*
BY *Walter J. Caine*
Robert A. Dunham
ATTORNEY

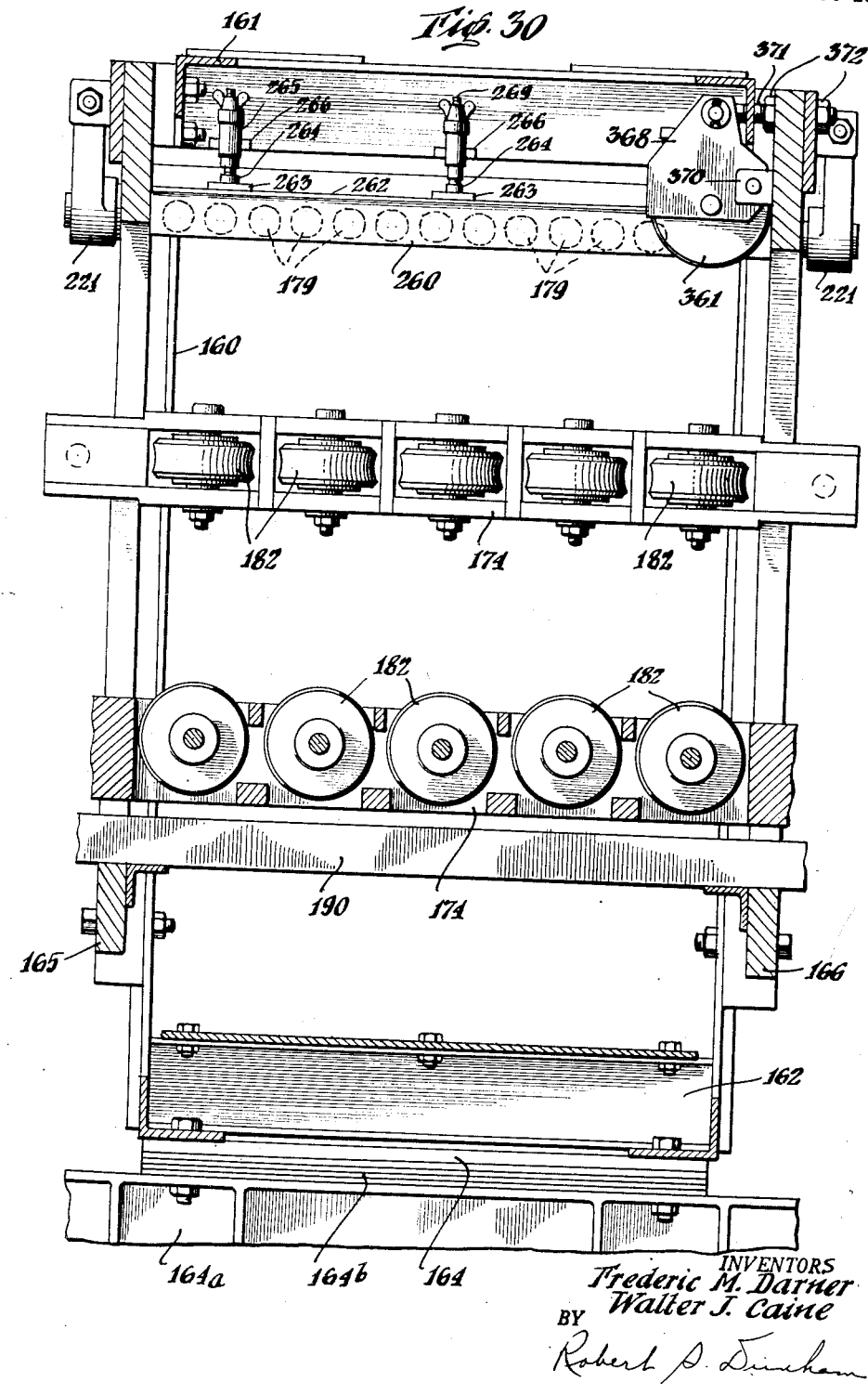

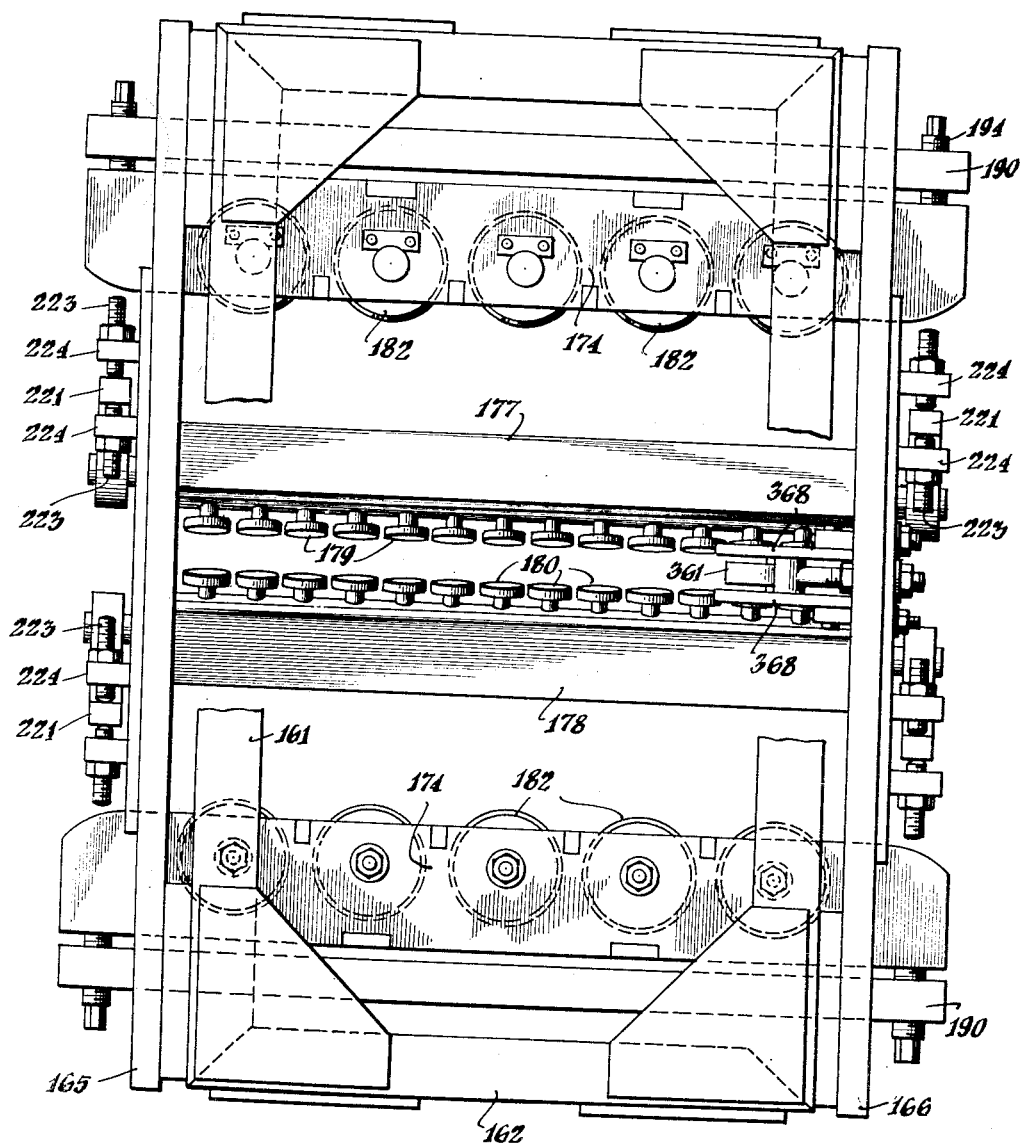

Patented Jan. 5, 1954

2,665,362

UNITED STATES PATENT OFFICE 2,665,362

MANUFACTURE OF PIPE

Frederic M. Darner, Shaker Heights, and Walter J. Caine, Cleveland Heights, Ohio, assignors to Republic Steel Corporation, Cleveland, Ohio, a corporation of New Jersey Application June 14, 1949, Serial No. 99,101

36 Claims. (Cl. 219—6)

This invention relates to the manufacture of pipe, i. e. tubular structures of metal, and in important specific respects is directed to novel apparatus and procedure for making pipe of relatively large diameter, for example, a diameter of the order of 20 inches or more, from skelp or plate stock which has been formed to a tubular configuration and which requires the closure and fastening of a seam extending axially thereof. By way of example, one embodiment of the apparatus specifically described hereinbelow was designed to manufacture steel pipe having an outside diameter of the order of 24 to 30 inches, and having a wall thickness which may be as great as ¼ to ⅜ inch or so, the material being steel of physical characteristics suitable to withstand ultimate service of the pipe in carrying various fluids, e. g. liquids or gases, under substantial pressure. It will be appreciated, nevertheless, that a number of features and combinations disclosed herein may be applied to the manufacture of other types of pipe, i. e. other tubular articles, or for other operations.

While various types of apparatus have heretofore been proposed and used for manufacturing pipe, especially pipe of small diameter wherein a seam is continuously welded lengthwise of the pipe upon appropriate relative motion between the pipe blank and the welding device, the manufacture of articles of the character noted above, i. e. so-called large diameter pipe, involves special problems and considerations. The magnitude and weight of the work, i. e. the pipe blanks, upon which the machine is to operate, render pipe handling equipment of ordinary types inadequate or ineffective; for instance, the sections of 2 to 2½ foot (O. D.) pipe mentioned above may be 30 feet long and weigh one ton or more. Indeed the proportions of wall thickness, diameter and length of the pipe sections present special and unusual difficulties, notably in providing true alignment of the pipe and its seam relative to the welding equipment, in providing accurate and uniform travel of the pipe past such equipment and without undesirable fluctuation in seam position, and finally in preventing relative movement, even of a slight extent between the sides of the welded seam both during and after the welding operation, i. e. until the weld metal has fully solidified and set.

Accordingly, important objects of the present invention are to afford improved apparatus and procedure for the manufacture of tubular articles, especially articles of large diameter, so as to produce, with economy and rapidity, products of such character having uniform size, high strength and durability. Other objects are to provide new elements and combinations of apparatus for pipe manufacture, which are rugged and relatively simple in construction, yet fully effective for the purpose, and to provide such apparatus which is not only well suited for pipe production of a selected size but may be readily adjusted or modified, i. e. in the case of any given machine, to convert it to the manufacture of pipe of other specific sizes.

A further object is to provide new and improved arrangements for advancing into pipe-guiding and welding means, successive portions or lengths of pipe blank for operation of the first-mentioned instrumentalities, the invention being also designed to afford such advancing means which are adapted to cooperate in the alignment of the pipe and in maintenance of or agreement with the desired speed of pipe advance through the machine, such speed of advance being controlled by other instrumentalities to which the advancing means displaces the work.

Another object is to provide improved guiding and driving means, adapted to receive and advance successive, formed pipe blanks toward the seam-welding instrumentalities, and particularly to provide such guiding means which is adapted, in a highly effective and accurate manner both to align the cleft in the pipe blank for the welding operation and to provide effective drive of the blank past such welding instrumentalities. Corollary objects are to afford improved structural arrangements for guiding means of the character stated, including novel mounting devices for such elements and cooperating arrangements of effective character for maintaining the desired configuration of the pipe blank, as well as to cooperate in bringing the edges of the cleft into the desired closed or other relation for function of the welding devices.

A particularly important object of the invention is also to provide, in apparatus of the stated character, new, more rugged and yet more accurate and reliable instrumentalities for guiding, holding and positioning the pipe blank and especially the edges of its cleft, while relative motion between the blank and the welding instrumentalities is effected to produce the desired seam. Special objects are also to provide such pipe-holding means, of the nature of a chuck device, wherein the edges of the cleft are more perfectly aligned and supported both during the welding operation and until the metal has solidified and set, and likewise to afford a chuck device which is readily adjustable for accurate conformity with the dimensions of the pipe blank, which is easily serviced for repair or replacement of its elements as necessary and which is especially adapted for convenient re-setting or replacement of parts to accommodate pipe blanks of widely different diameters. A further object is to provide improved arrangements, cooperating with the pipe holding chuck or the like, for supporting, guiding and controlling the welding means, to enhance the accuracy and uniformity of seam production along the cleft in the pipe blank.

Another object is to provide new and efficient means, preferably cooperating with the welding chuck and the welding instrumentalities per se, to promote efficient and convenient use of a type of welding which requires relatively substantial quantities of flux, e. g. divided, solid flux, or other loose material, at the locality of weld, such means being particularly designed both to avoid interference of the flux material with operation of other instrumentalities and to maintain desired localization of such material.

Another and notably significant object is to afford new and improved instrumentalities, cooperating with the chuck and welding devices and disposed internally of the pipe blank, for guiding and holding the latter during operation of such other devices; an allied object being to afford such internally disposed means, which cooperates to maintain a chilling or cooling device in accurate alignment and position with a surface of the pipe blank for properly limiting the depth of penetration of the weld and later aiding in solidifying the welded seam. Another object is the provision of new and effective instrumentalities for promoting desired register of the edges of the cleft as the same are advanced past the seam-welding device.

To these and other ends, including further objects such as will be hereinbelow apparent or as are incidental to the use and operation of the described improvements, certain presently preferred embodiments of the invention are described below and shown in the accompanying drawings, by way of illustrative example which is believed to demonstrate the several features, combinations and principles of the invention.

Referring to the drawings:

Figs. 1-A and 1-B are a plan view of the apparatus, omitting a number of details of certain parts but showing the general arrangement, these figures being intended as in effect a single view, interrupted at the broken line;

Figs. 2-A and 2-B are a view, corresponding to Figs. 1-A and 1-B, of the apparatus in elevation;

Fig. 3 is a detail end elevation of a central part at the righthand end of Fig. 2-B, greatly enlarged, showing certain pipe advancing instrumentalities.

Fig. 4 is a section on line 4—4 of Fig. 3;

Fig. 5 is a fragmentary view on line 5—5 of Fig. 4;

Fig. 6 is a vertical sectional view on line 6—6 of Fig. 2-A, greatly enlarged, showing certain pipe guiding and advancing means;

Fig. 7 is a vertical section on line 7—7 of Fig. 6;

Fig. 8 is a fragmentary vertical section, with certain parts in elevation, taken on a plane through the axis of the advancing pipe and showing structure at the lefthand end of Figs. 1-A and 2-A, including various pipe guiding and holding instrumentalities (in part constituting the chuck device) in the vicinity of the welding station;

Figure 1B:
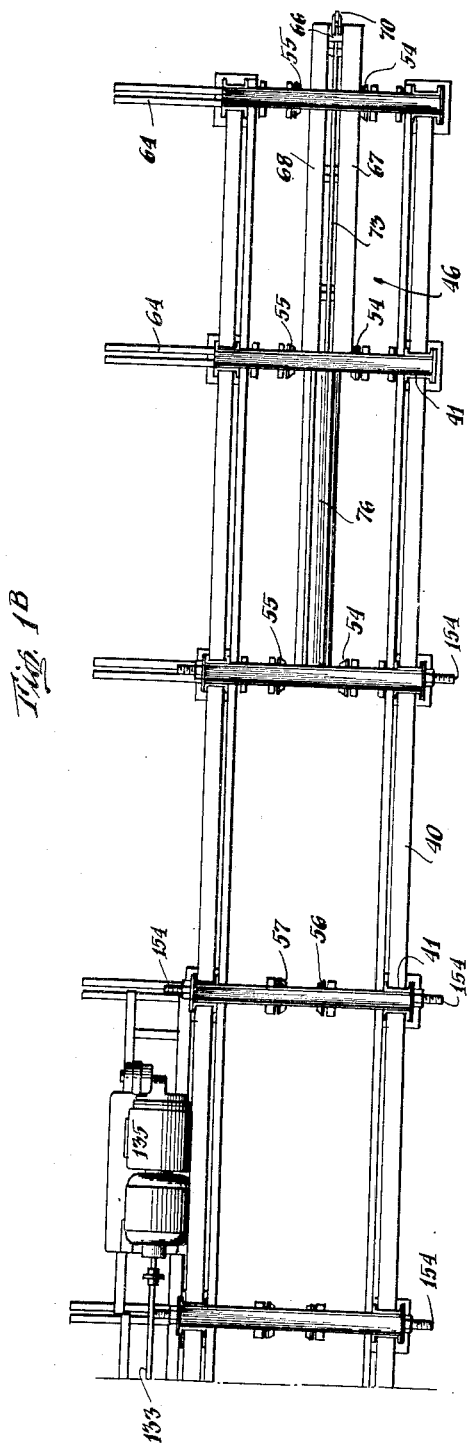

Fig. 8-A is a fragmentary view, chiefly in vertical section along a plane through the pipe axis, showing certain internal parts of the carriage device of Fig. 8;

Fig. 8-B is a fragmentary section on line 8-B—8-B of Fig. 8-A;

Fig. 9 is a greatly enlarged, fragmentary section on line 9—9 of Fig. 8;

Fig. 10 is a fragmentary section on line 10—10 of Fig. 9;

Fig. 11 is an enlarged elevation of the lefthand end of the apparatus (as seen in Figs. 1-A and 2-A), i. e. the chuck, with certain parts in section on planes spaced from such end;

Fig. 12 is a perspective, somewhat diagrammatic view showing certain frame structure of the pipe-engaging chuck means illustrated in Fig. 11;

Figs. 13 and 14 are fragmentary sections taken respectively on lines 13—13 and 14—14 of Fig. 11;

Fig. 15 is an exploded, fragmentary view, in perspective, showing elements of certain adjusting means for the roller cages illustrated in Figs. 11, 13 and 14;

Fig. 16 is a fragmentary horizontal section taken on the line 16—16 of Fig. 11, with certain parts omitted;

Fig. 17 is a side elevation, taken as if on line 17—17 of Fig. 9, showing a roller cage arrangement at the upper part of the chuck means, such as also shown in Fig. 16;

Fig. 18 is a fragmentary elevation of part of the end mounting plate of the chuck means, but without certain attached parts shown in Fig. 11;

Fig. 19 is a perspective view of a removable supporting plate illustrated in Fig. 18;

Fig. 20 is a fragmentary section, on a very enlarged scale, of certain parts similarly shown, but in elevation, at the upper portion of Fig. 9;

Fig. 21 is a side elevation, taken partly in vertical section on the same plane as Fig. 8, but from the other side, and showing details of the welding means omitted (for clarity) from Fig. 8;

Fig. 22 is a vertical section on line 22—22 of Fig. 21;

Fig. 23 is a fragmentary view, essentially in plan, on line 23—23 of Fig. 21;

Fig. 24 is a perspective, schematic view, showing the general relationship of certain representative elements of the apparatus in operation upon a pipe blank;

Figs. 25, 26 and 27 are diagrammatic views illustrating the manner of advance of successive pipe lengths through the machine, Fig. 25 including schematic illustration of control means for pipe advancing instrumentalities shown in Figs. 3 to 5;

Fig. 28 is a perspective, schematic view showing an alternative form of pipe advancing means and also further illustrating a type of pipe blank upon which the machine may operate;

Fig. 29 is an elevation of a further part of the internal carriage device shown in Fig. 8, with certain associated structure, Figs. 8 and 29 thus in effect representing a single complete view of the carriage and its support, interrupted between the right hand end of Fig. 8 and the left hand end of Fig. 29;

Fig. 30 is a section of the chuck, taken on the same vertical plane as Fig. 8, but shown without the pipe blank and without the internal carriage; and Fig. 31 is a plan view of the chuck, shown without the welding instrumentalities and without the flux shields.

In essence, the complete apparatus illustrated in the drawings is designed to receive successive lengths of metal in tubular configuration, which may be generically herein designated as pipe blanks, and each of which may consist of a steel sheet or plate, called skelp when used for pipe manufacture, of relatively heavy gauge, formed in a tubular shape with a cleft or open seam extending longitudinally thereof, such cleft requiring closure (herein conveniently called a seam) along its length to produce a finished section of pipe. During the seam-welding operation it is required that the tubular structure be appropriately held to avoid distortion or malformation of the product from an intended, uniform configuration. More specifically, the successively received pipe blanks are advanced and aligned, being moved axially past a welding station where the welded closure is effected along the cleft, the blanks being held against lateral displacement and particularly against relative movement of the edges of the cleft until the welded seam is fully set, and the welded pipe lengths being progressively discharged at the forward or outlet end of the apparatus. The entire operation is preferably continuous, i. e. in that the motion of a pipe blank through the machine need not be interrupted from the time of its original introduction until its ultimate discharge as a finished section of pipe. While the several instrumentalities, combinations and devices set forth are peculiarly adapted for cooperation in the complete apparatus shown and contribute to the effective functioning of the latter for yield of uniform pipe having high strength and durability, it will be understood that such elements and sub-combinations may have independent utility or may be used in other combinations, or may in some cases be replaced in the present apparatus by other devices. Nevertheless, as stated, the illustrated machine represents an effectively functioning unit wherein all of the various elements cooperate both mechanically and in practical effect, to the attainment of the results outlined hereinabove.

The general organization of the complete apparatus may be seen in Figs. 1-A, 1-B, 2-A and 2-B. The feeding and aligning devices are mounted along a main frame 40, which includes spaced, upright members 41 and associated beams and supporting parts so as to constitute a rectangular frame extending along the path of pipe advanced and in effect, surrounding such path. Successive pipe blanks 44 are introduced axially at the righthand end of Figs. 1-B and 2-B, for operation of the reciprocating feeding means generally designated 46. The latter pushes the pipe length in a direction to the left as seen in these figures, to the guiding, advancing and aligning devices (Figs. 1-A and 2-A) which include sets of pinch rolls generally designated 48, 49 and 50, that positively engage the wall of the pipe blank to move it further along the path, as will be more specifically described below. These devices advance the blank through a welding head or chuck generally indicated at the lefthand end of Figs. 1-A and 2-A as at 52. As the pipe blank moves longitudinally through the chuck at 52, the welding operation, to close the seam in the pipe, is effectuated by a welding assembly conveniently disposed above the pipe and generally designated 54a in Fig. 21 (looking from the other side than Fig. 1-A), illustration of the welding means and of details of the chuck being omitted from Figs. 1-A and 2-A for the sake of clarity.

The apparatus also includes a carrier device generally designated 56a (Fig. 8), which rides in a stationary position inside the pipe as the latter advances, the supporting structure and functional parts of carriage device 56a being such as more fully set forth below, including means cooperating with the chuck and the welding assembly, to keep the pipe blank in proper position and alignment. It will be understood that means for forming the pipe blank to the desired tubular shape prior to its insertion in the apparatus of Figs. 1-B and 2-B, and likewise means for such further or finishing operations as may be desired for the closed pipe leaving the chuck at 52 in Figs. 1-A and 2-A, form no part of the present invention and are, therefore, not shown herein. It will also be understood that in order to facilitate entry of the pipe blanks at the righthand end of the apparatus shown in these figures and similarly to facilitate withdrawal of the completed pipe after each length of it has been fully ejected from the chuck 52, suitable supporting carrier devices may be employed, such as rollers along which the pipe may be manually pushed, but being conventional elements, are likewise omitted from the present views for the sake of simplicity.

As indicated above, the illustrated apparatus is adapted to handle pipe blanks, and to produce corresponding pipe lengths, of extraordinary size and weight, for instance individual tubular pieces having a diameter of 20 to 30 inches or so and a length of about 30 feet. Such pipe lengths, having a wall thickness of the order of ⅛ inch to one-half inch or so, are extremely heavy and cumbersome pieces, fully rigid to any manual pressure or the like, and indeed having a weight, depending on the diameter and on the gauge of the wall, of the order of ½ to 1½ tons or more.

*Reciprocating feeding means*

Figure 2B:
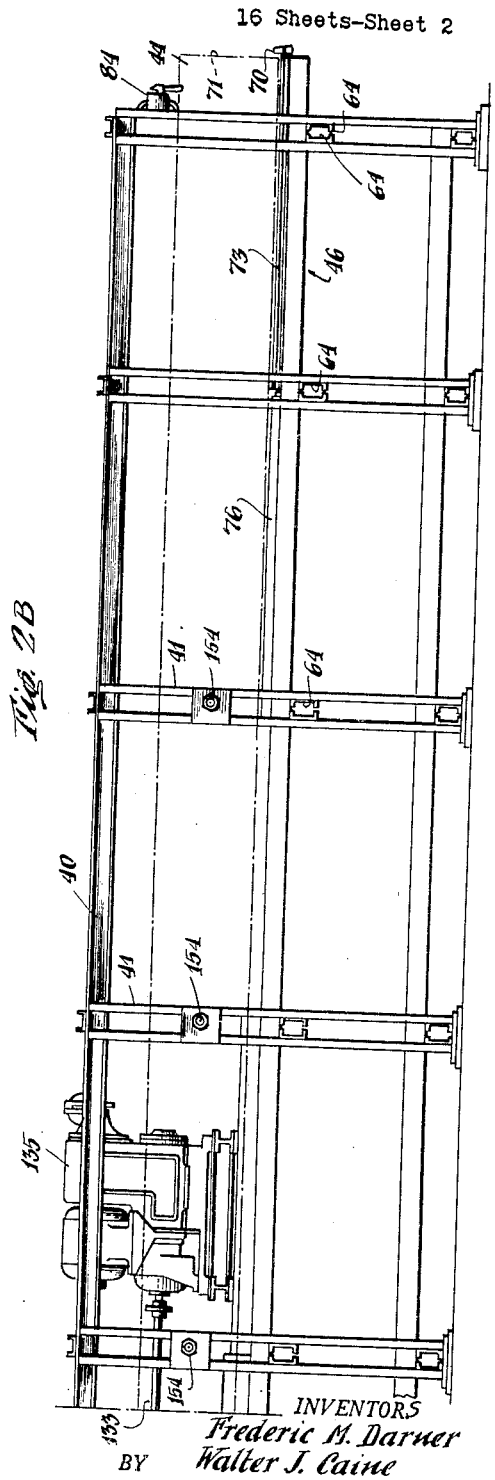

Although in some cases other provision may be made for advancing successive pipe blanks to the pinch rolls 48, the illustrated apparatus includes a device 46 which pushes the pipe blank 44 lengthwise from the position indicated in Fig. 2-B, into engagement of its leading end with the first set of pinch rolls 48. To support the blank and facilitate its advance along the designated path, as by the means just mentioned, there are provided pairs of movable devices such as balls, rollers or the like, for example the pairs of laterally spaced rollers 54, 55 which may have a tapered configuration as shown and which are arranged to support the underside of the pipe blank 44 (Fig. 3) so that it may roll easily in the intended direction. As will be noted in Fig. 1-B, sets of these rollers are disposed at successive, spaced positions longitudinally of the path, as likewise sets of generally similar rollers 56, 57 at further localities along the frame 40. As also shown in Fig. 3, each of the rollers such as the roller 54, has a stub shaft 58 on which it is carried and which is journalled for free rotation in bearings 60, 61 mounted on suitable spacing supports 62 affixed to a cross member 64 of the frame. To accommodate pipe of different diameter, the support members 62 may be changed and reaffixed in other suitable relation, and if desired, the rollers 54, 55 may be substituted by others of appropriately different taper.

As further shown in Figs. 1-B, 2-B, 3, 4 and 5, a slide or cross head 66 is arranged to slide in ways 67, 68 extending longitudinally of the pipe path and below the latter. The cross head 66 carries a bracket 69 having pivoted to it, on a horizontal axis, a pusher arm 70 which may have a hook-like shape as shown and which is adapted to engage the trailing edge 71 of the pipe blank 44 at the lowermost locality of such edge. The cross head 66 is also secured at the end of a piston rod 73 which extends to a piston 74 (Figs. 25, 26 and 27) reciprocable in a cylinder 76 which may be actuated by suitable fluid and is preferably of double-acting type controllable to drive the piston rod 73 positively in each direction, longitudinally of the pipe path. The ways 67, 68 and the cylinder 76 are mounted on support beams 80, 81 which are carried on frame cross members such as the member 84 and which may be supplemented with shims when necessary, so as to adjust the elevation of the reciprocating pusher to other pipe blanks of different diameters.

While water, oil or other liquid, may be employed, under pressure, for operation of this and other fluid-actuated instrumentalities of the apparatus, it is at present preferred to employ gaseous fluid, e. g. air-operated cylinders. Thus in the device shown, the cylinder 76 may be supplied with compressed air from a suitable source (not shown) so as to advance the cross head alternately to the left, in pipe pushing direction (Fig. 4) or in return direction to the right, under suitable control.

Assuming that the arm 70 is engaged with the rear edge 71 of a pipe blank 44, displacement of the piston rod 73 from its outermost position of Figs. 1-B, 2-B and 4 (full line position) carries the arm to the left and thereby pushes the pipe blank along the rollers 54, 55 for such distance as is necessary to bring the leading edge of the blank into engagement by the first set of pinch rolls 48. The latter, being positively driven as explained below, then grasp the pipe wall and continue the advance of the blank through the machine. In the meanwhile, another pipe blank has been inserted into the path, i. e. along the rollers as by manually or otherwise pushing it into place. The cross head 66 and arm 70 are then moved back from the dotted line position 70a (the end of the previous stroke) to the original position, by reversal of compressed air supplied to the cylinder 76. During such travel and indeed during any time of intended relative motion between a pipe blank and the arm 70, the latter rocks about its pivot as shown at 70b, so as to slide under the new pipe blank 44 until the end of the latter has passed, whereupon the weight of the tail portion 78 of the arm causes it to swing into operative position. The arm is held against swinging further (beyond such position) by a stop 79 on the cross head, engaging the tail portion 78. The cycle may then be repeated, i. e. it being assumed that in the meanwhile the preceding pipe blank has advanced into the pinch rolls 48, 49, 50, with the leading end of the new blank pressing against the rear end of the first one.

By way of illustrative example of a control for the pusher 46, Fig. 25 shows diagrammatically a manually controlled valve device 84 having conduit connections 85, 86 to opposite ends of the cylinder 76 and having an exhaust or relief duct 87 and a compressed air supply pipe 88, it being understood that such valve may be of any suitable, known type whereby the operator actuates the handle 90 so as to connect the opposite ends of the cylinder respectively and alternately with the air and exhaust for accomplishment of successive strokes.

The general operation of the advance of pipe blanks may also be seen in Figs. 25 to 27 inclusive, showing successive stages. Thus in Fig. 25 one blank 44a is being advanced by the pinch rolls 48 to 50 through the chuck at 52 while a succeeding blank 44b has been moved into position for operation of the pusher 46, i. e. with the trailing end of the blank 44b just ahead of the arm 70. Although in some circumstances the operation of the pusher need not be timed exactly with the advance of the preceding section 44a through the pinch rolls, the cylinder 76 is preferably actuated at once, i. e. when the parts have reached the condition of Fig. 25, to commence pushing the blank 44b to the left. Thus with the cylinder 76 acting to drive the pusher arm 70, the pipe length 44b is advanced against the end of the preceding length 44a, until the leading edge of the length 44b has been engaged by the first pinch rolls 48. To allow some leeway in operation, as well as for accommodation of some range of lengths of pipe blank, the stroke of the piston 74 and thus of the arm 70 is somewhat longer than necessary to bring the pipe length from the position of Fig. 25 into driving engagement by the first pinch rolls 48; the pusher may then continue exertion of its advancing force until the leading end of the blank 44b is well past the rolls 48 as shown in Fig. 26, i. e. indeed until the piston 74 has completed a full stroke, for example, of about eight feet.

A further blank 44c, moved into position for entry, is now manually or otherwise pushed into the machine, along the supporting rollers and preferably with its leading edge in firm abutment against the end of the now preceding blank 44b, i. e. as shown in Fig. 27. Although such abutment is convenient for assurance of the desired further results, it will be understood that in most cases it is at least necessary at this stage (i. e. to insure endwise abutment of blanks beyond the rolls 48) that the pipe blank 44c be advanced to the position previously occupied by blank 44b (Fig. 25) well before the trailing end of the preceding blank (44a in Fig. 25 and 44b in Fig. 27) has reached the rolls 48. With the blank 44c in the position of blank 44b in Fig. 25, the entire cycle of operation is repeated. It will be understood that at an appropriate intermediate time, for instance during the introduction of the blank 44c, the valve 84 was shifted to drive the piston rod 73 in reverse direction, relocating the arm 70 in its outward position, the arm having been tilted as shown in Fig. 27 until the rear end of the blank 44c cleared it.

As intimated above, even if a short gap temporarily arises between the adjacent ends of blanks 44a and 44b at the condition of Fig. 25, the nature of the drive of the arm 70, i. e. by the fluid operated cylinder 76, is such that the pipe blank 44b is rapidly advanced to close the gap before the meeting ends of the blanks 44a and 44b have reached the rolls 48. It will also be appreciated that when the successive pipe lengths are abutted endwise, the drive of the arm 70 by the cylinder is automatically just sufficient to keep the driven pipe blank in firm engagement with the one head of it, until the driven blank is grasped by the rolls 48. Thereafter the rate of drive of the arm 70, if the latter is permitted to complete its stroke, is similarly accommodated to the rate of advance of the pipe, now positively governed by the rolls 48. In other words, the inherently resilient or stall-permitting nature of the pusher means effectively cooperates with the driving instrumentalities 48, 49 and 50, so that the pipe blank is kept in engagement with the one ahead of it until the positive drive of the rolls 48 takes over the actual pipe advance. That is to say, while the pusher 46 is capable of advancing the blanks more rapidly than the rolls 48, 49 and 50 it yields to the regulated, consistent driving force of the latter, even to the extent of stalling without interruption of driving force, so that the pipe blank is actually urged along the path in appropriate synchronism with the operation of the pinch rolls.

It may also be noted that the pinch rolls serve to advance the pipe through the chuck at 52, either directly as in Fig. 25 or 26, or indirectly as in Fig. 27, where the leading pipe length 44a is being pushed through the chuck by the succeeding length 44b which is in turn positively driven by the rolls. Thus the pinch rolls 48 to 50, driven in common as explained below, constitute the sole governing drive for the entire apparatus, while the introductory pusher device 46 is automatically correlated to function therewith.

Fig. 28 shows an alternative arrangement of pipe pusher, similarly adapted for cooperation with the pinch rolls 48 and thus suitable for use, in some cases, instead of the device shown in Figs. 3 to 5. In Fig. 28 the pipe blank 44b disposed, for example, in the same position as the identically numbered blank in Fig. 25, has its rear edge engaged by a removable hook 92 which is secured at the end of a cable 93. The cable 93 is adapted to be wound on a drum 94, suitably mounted for rotation on a platform 95 or other support arranged at the top of the frame 40. By appropriate transmission 96 the drum 94 is driven by a so-called stall-type motor 98, viz. an electric motor of such character or having such transmission structure that its speed of drive may be reduced, even to zero, by obstruction to the drive without interrupting operation of the motor, i. e. without interrupting the exertion of driving force on the drum 94 in the present case. It will thus be seen that when the hook 92 is placed at the end of the pipe blank 44b and the other end of the cable 93 is appropriately secured to the drum 94, operation of the driving instrumentalities 98—96 in the proper direction will take up the cable on the drum and advance the pipe in the direction of the arrow, viz. against the end of the preceding pipe blank 44a. By virtue of the stall-permitting nature of the drive, the arrangement may function in a manner similar to that of the fluid pressure operated device in the preceding figures. At the end of the advance of the pipe for the desired distance, and upon interruption of energization of the motor 98, the hook 92 may be removed and the line 93 may be manually pulled out, to ready the device for advance of the next pipe length.

While the feeding of pipe blanks through the machine may be accomplished by operations as described above without any actual attachment between successive blanks or lengths, their preliminary alignment and insertion may in some cases be facilitated by a temporary welded connection between the abutting ends of successive pieces. For example, as shown at 99 in Fig. 28, the end edge of blank 44a may be preliminarily welded (as by a hand welding unit), over a small circumferential distance of an inch or two, to the mating edge of the next blank 44b, preferably at a locality close to the cleft 100, i. e. designated 100a and 100b for the respective pieces in Fig. 28. Under such circumstances, feed and alignment of the pipes in the machine are facilitated, the advancing device 46 in Figs. 1-B and 2-B or the alternative structure in Fig. 28 (the preliminary welding step being applicable for use with either) then still operating essentially in the manner described above to push each successive pipe length against the preceding length and into engagement by the first of the pinch rolls. In effecting a temporary tack weld for the above or similar purposes indicated below, the clefts 100a, 100b should be exactly aligned, as by suitable, temporary clamping means, not shown.

While it is possible in some cases to dispense entirely with the preliminary pusher device 46 or its equivalent, as by welding the successive pipe ends together (in the incoming train of pipe) at, say, at least two localities on opposite sides of the cleft (so that in such event a continuous train of pipe lengths is established and pulled bodily into the apparatus by that one of them which is engaged by one or more of the pinch rolls 48—50), the reciprocating pipe advance arrangements shown in the drawings are believed to afford a peculiarly convenient feeding operation. To the extent that one or more preliminary welded connections between successive pipe lengths may be employed, as at 99, Fig. 28, such connections can be burned apart or otherwise severed after the joint between pipe lengths comes out of the welding chuck at the lefthand end of the apparatus (Fig. 1-A).

*Driving and aligning means*

The pipe blank progresses (from the pusher device) through the successive pinch rolls 48, 49, 50 and associated instrumentalities which guide and align the pipe to and through the welding chuck at 52, and also serve the purpose of positive drive of the pipe through the latter instrumentality. As will be explained in more detail below, the welding chuck comprises further means engaging the pipe at a multiplicity of localities to hold it steady while the cleft passes the seam welding station and while the resulting weld becomes firmly set. Since each of the sets of pinch rolls may be conveniently identical with the others, although preferably with the exception of the thickness of an aligning fin as explained hereinbelow, reference to and description of the pinch rolls 50 in Figs. 6 and 7 will suffice for a description of all sets.

Referring to Figs. 6 and 7 as well as Figs. 1 and 2, the arrangement comprises a head structure including spaced cross-beams 102 mounted on the main frame (designated by uprights 41 in Fig. 6) through the spacer beams 103, which may be selected in size to suit the diameter of the pipe for which the machine is set. The structure of beams 102 carries, depending from it, a pair of journals 104, 105 for the shaft 106 of a concave roll 108, which is thus disposed to turn about a horizontal axis across the path of pipe travel and which is contoured to fit a substantial extent of the upper, cylindrical surface of the pipe blank 44. The roll 108 also carries or embodies a central, disk-like fin 110 which is adapted to project continually, as the roll turns, through the cleft 100 of the pipe blank.

While the fin roll (Figs. 6 and 7) may be made in other ways, the illustrated structure comprises a pair of complementary sections 108a, 108b keyed to the shaft 106 and assembled with the separate fin member 110 between them. The section 108b is recessed or counter-bored at one end to engage a collar 109 integral with the shaft, so that a plurality of long bolts 111 may be passed through the assembly of section 108a, fin 110, section 108b and a retaining ring 111a (which engages the outer side of the collar) to clamp such assembly together and thus hold the roll parts firmly against the collar and in assembled relation on the shaft.

Inside the pipe blank a mating roll 112 having a convex shape similarly contoured to fit exactly the inside, cylindrical surface of the blank 44, is mounted to rotate on a horizontal axis about a shaft or rod 114. The rolls 108 and 112 thus constitute the set of pinch rolls 50. The shaft 114 is carried by a plate 116 which extends freely in both forward and rearward directions (as shown in Figs. 7 and 2-A) through a central cleft or slot 117 in the roll 112 and which has upwardly extending portions at each end, i. e. beyond the circular fin 110 in the path of the pipe, such vertical portions or ligaments being designated 118, 119 in Figs. 2-A and 7. Since the ligaments 118 and 119 are of at least no greater thickness (and are preferably slightly thinner) than the fin 110, they may pass through the cleft 109 of the pipe and extend upward to be fastened at the lower ends of a corresponding pair of mounting studs 120, 121. The latter are carried on heavy spring supports 122, 123 (Fig. 7), which are in turn respectively sustained by the cross-beams 102. The spring supports 122, 123 may constitute, for instance, double coil spring arrangements under compression, having high strength and compressive force, like the springs of railroad car trucks. The slot 117 in the lower roll 112 also permits entry of the fin 110 of the upper roll, as shown in Fig. 7, so that the roll surfaces may engage the pipe wall between them, with a conforming fit. The strong pressure of the springs 122, 123, aided in part by the force exerted through the pipe from other rolls in contact with it as explained below, thus serves to keep the rolls in full compressive engagement upon the pipe, for effective shaping of the cleft edges (and adjacent regions of the skelp) and for effective driving contact.

One end 127 of the shaft 106 is splined, as shown, to be engaged in turn by a flexible coupling member 128 carried on the shaft 129 of a gear unit 130. As shown in Fig. 1-A, the other sets of pinch rolls 49, 48, have identical gear units 131, 132, respectively, all of the gear units being adapted to be driven in unison from a common shaft 133 which runs lengthwise of the apparatus and is in turn rotated by a motor drive unit generally designated 135, which may be of appropriate, known design and which has sufficient power for the described purpose of operating all of the pinch rolls at a controlled, predetermined speed under a heavy load, and despite some variation in such load, as by reason of minor irregularities in the pipe blanks.

As shown schematically in Fig. 6, the shaft 133 carries in each of the gear units such as the unit 130, a worm 136 which engages a worm gear 137 on the shaft 129. At spaced localities for cooperation with the sets of pinch rolls, such as the set 50 constituted individually by the rolls 108, 112 in Fig. 6, there are provided additional guiding rollers 140, 141, concavely contoured to fit the cylindrical surface of the pipe and rotatably mounted in bearing brackets 142, 143 so as to abut opposite sides of the pipe at the vicinity of a transverse horizontal line intersecting the pipe. The rollers 140, 141 are set, in effect, to urge the cleft edges against the fin 110. Beneath the pipe (see also Figs. 2-A and 24-27) spool-shaped rolls 145, i. e. comprising the rollers 56, 57, are mounted, the roll surfaces being tapered to fit the pipe as in the case of rollers 54, 55, each roll device 145 being journaled at its ends in suitable supports 146, 147, carried by the frame. Thus as the pipe blank passes through the pinch rolls 48, 49, 50, it is not only firmly engaged by the latter but also positively supported at side and bottom surfaces by the several cooperating rollers just described. It will be noted as shown in Figs. 2-A and 24-27, that the devices embodying the rollers 56, 57 are advantageously disposed at localities intermediate the successive pinch rolls, and also at localities beyond and behind the array of pinch rolls, in the path of travel of the pipe blanks.

The side rollers 140, 141, may be placed at the same localities as the rollers 56, 57, as shown by their mounting studs 154 in Figs. 1-A, 1-B, 2-A and 2-B.

For optimum alignment of the pipe blanks, particularly with respect to the seam and its alignment for advance beneath the welding means hereinbelow described, the fins 110 in the successive pinch roll assemblies 48, 49, 50 are graduated in thickness, i. e. with the thinnest fin in the roll 108 of the set 50, a somewhat thicker fin 110a in the upper roll 108a' of the set 49 and a still thicker fin 110b carried by the upward roll 108b' of the first or entering set 48. For instance, the fin 110 may have a thickness of ⅜ inch, the fin 110a of ⅝ inch and the fin 110b of ⅞ inch. It will also be noted that each fin tapers to a relatively sharp, outer or peripheral edge, as at 148 in Fig. 6, to facilitate entry of the fin in the cleft of the pipe.

While the pinch rolls and associated roller assemblies are designed and set so as to provide a gradual closing of the pipe cleft, i. e. appropriate to achieve a condition of squarely abutting closure of the edges of the cleft as it traverses the welding chuck, it is understood that generally, the chief or ultimate closing force on the cleft is provided by the pipe-engaging roller means hereinbelow described as embodied in the chuck. That is to say, as the leading portion of a pipe length enters the chuck, the latter firmly but effectively brings the edges of the cleft together. By virtue of the rigidity or stiffness of the pipe wall, and its natural tendency to resist flaring or distortion, the closing force is in effect distributed throughout the entire length of the pipe; in other words, when the pipe is forced closed at one end, it tends to close all the way along the cleft. In consequence, it is understood that in considerable part the instrumentalities including the successive fins 110b, 110a and 110, serve primarily a guiding and aligning function and may indeed, for better effectuation of that function, really act to keep the cleft open at localities to the rear of the chuck, while the blank is advanced.

At least to a certain extent, however, the organization of rolls and rollers including and assisting each set of pinch rolls, may have a cleft-closing effect. For instance as the leading edge of a given pipe blank enters the assembly including the pinch rolls 49, such assembly exerts closing force which is transmitted back, by the pipe blank, throughout its length; yet the cleft is kept tapered by the fin 110b of the rearward rolls 48. A like and further closing effect occurs at the station of the rolls 49, i. e. in the case of a pipe blank which has its leading edge advancing to but not yet within the chuck at 52 (Figs. 1-A and 2-A); indeed in such case, the tapering effect by which the fins 110a and 110b of the rearward rolls 49 and 48 keep the rear end of the cleft wider apart, causes the forward end to approach closing, for the ultimate and positive closing operation when the forward end actually enters the chuck. These relationships of the several sets of pinch rolls, fins and accompanying rollers may be further appreciated from the schematic view of Fig. 24.

The arrangement of the pinch rolls is conveniently such as to permit accurate adjustment of them in a direction crosswise of the pipe. For example, each of the beams 102 is secured to the spacing element 103 by bolts 150 traversing slots 151 in the flange of the beam. Thus the beams 102 can be shifted to either side, as seen in Fig. 6, so as to afford the desired precise alignment of the fin 110, and indeed of the entire assembly of rolls 108, 112 in the path which the cleft should follow to the welding chuck. The splined connection 127 permits the shaft 106 to slide axially relative to the shaft 129 during such adjustment, while maintaining driving connection. Similarly the brackets 142, 143 which carry the side rollers 140, 141, are mounted on threaded studs, such as the stud 154 for the roller 141, that may be adjusted (toward and away from the pipe path) and secured by the releasably locked nuts 155 on the frame structure. The bottom rollers 57, 56 may have a mounting adjustable similarly to the beams 102, as by slotted bolt holes (not shown). The several parts making up the assembly may thus be carefully set in a desired position for exact alignment of the passing pipe, the adjustable character of the mountings also facilitating adaptation of the apparatus to fit other diameters of pipe.

It will now be seen that the successive pinch rolls 48, 49, 50 and associated parts cooperate to guide and align the pipe toward the welding chuck, while at the same time the pinch rolls afford a synchronized positive drive of the successive pipe blanks through the machine. The hardened steel faces of the contoured pinch rolls themselves are arranged for conforming and driving engagement of the pipe wall between them, the springs 122, 123 permitting any minor irregularities or variations in pipe thickness or shape, to be relieved, i. e. by displacement of the lower roll 112, without placing undue frictional stress on the pinch rolls and without damaging them or the pipe or any part of the apparatus.

While these rolls 48 to 50 and their associated instrumentalities have at most only part of the closing action for the cleft, and are not designed for appreciable forming or shaping action with respect to the curvature of the pipe blank except near the cleft edge, their combined effect in initiating closure at necessary times is important, and even more so, their described and similarly cooperative driving and aligning action. While an even greater number of sets of pinch rolls and accompanying rollers may in some cases be employed, in spaced array lengthwise of the path of the pipe, the combination of at least three such sets of rolls, with their guiding fins, is believed practically essential for the improved alignment operation herein described on pipe sections of the character contemplated. With such combinations the effects mentioned above are fully realized, and moreover, each section of pipe traversing the welding chuck at 52 (Figs. 1-A and 2-A) is simultaneously engaged by at least two of the sets of pinch rolls until over a very considerable part of the length of the pipe, the cleft has actually been welded closed and advanced out of the chuck. Thus during the entire welding operation on each long pipe blank, there is no time at which it is not in effect rigidly held to shape throughout its entire length. Other advantages of the guiding and driving units have been mentioned above, including the novel mounting structures; a particularly important feature is the arrangement of the thin ligaments 118, 119, whereby each lower roll 112 is effectively supported inside the pipe blank, for positive engagement in cooperation with the upper, driven roll 108.

While the fin-carrying pinch rolls and the associated roller devices to the rear of the chuck (at 52) afford a desirable alignment and feed of the successive pipe blanks, supplemental guiding means may also be included between such instrumentalities and the chuck. For example, as shown in Figs. 1-A, 2-A and 8, supporting means 157 depending in the frame structure 40 may carry a number of freely rotating rollers 158, i. e. relatively small rollers contoured to fit the pipe and arranged to bear on its upper surface in bridging relation to the cleft. As shown there may be, for example, five (5) such rollers arranged in a spaced array, between the forward set of pinch rolls 50 and the entrance to the chuck at 52, such rollers cooperating with the other instrumentalities to keep the pipe length, particularly at its seam locality, at the desired position and level for passage in and through the chuck.

*Welding chuck*

The instrumentalities to be embodied at 52 in Figs. 1-A and 2-A, conveniently described as a chuck, are mounted on a rectangular frame structure as there shown, which includes uprights 160, and at the top and bottom, transverse members 161 and longitudinal members 162, all reinforced by corner plates as at 163. This frame and hence the entire chuck is supported by a pair of horizontal shoe or sole plates 164 welded to the underside of the frame and extending from front to rear of the chuck, i. e. in the direction of pipe travel. The underside of each plate being accurately machined, the plates constitute an accurate supporting surface for mounting the chuck, as upon the structure 164a, in proper position and alignment. Shims 164b may be used beneath the plates 164 if necessary.

Among others, one important function of the chuck is to induce compressive strain in the wall of the pipe blank, throughout its circumference, to urge and hold the cleft edges together under considerable force, the cleft edges being also kept in the desired, precise registration and alignment.

The several pipe-engaging parts of the chuck (see also Figs. 8, 30 and 31) are preferably mounted on a pair of removable plates 165, 166 disposed across the frame respectively at the front and rear faces thereof, in the direction of pipe travel. As shown in Fig. 12 each of the plates (the plate 165 being there depicted, and the other plate 166 being essentially identical in structure and mounting) is removably bolted to spacing supports 167 carried at the upper corners of the frame face and spacing and supporting brackets 168 disposed at lower parts of the frame face at each side, the brackets 168 having projecting portions 169 to seat the bottom edge of the plate 165. As will become further apparent below, this arrangement permits ready adaptation of the apparatus to operation on different sizes of pipe, in that in order to change over from one size to another the plates 165, 166 can be removed, and with them all of the associated equipment, without altering the frame structure; substitute plates for the different size of pipe are then inserted and secured in the same positions.

Each of the plates 165, 166 is of relatively heavy gauge steel (for example 2 inches thick) to carry the necessary high pressure of the pipe-engaging rollers, and is formed with a large, central, circular opening 170 (Figs. 11 and 12), having ample clearance for passage of pipe of selected diameter. Extending radially from the central opening in a multiplicity of directions, are relatively wide and deep slots or notches 172, each adapted to support one end of a roller cage generally designated 174, i. e. so that such cage is mounted upon and between the two plates, and thus extends longitudinally along the path of the pipe, parallel to the pipe axis. While in some cases other numbers of sets of rollers may be employed, an important feature of the invention resides in the engagement of the pipe blank at a multiplicity of localities spaced rather closely around the circumference thereof. Accordingly instead of merely engaging the pipe, say, at places separated by 90° or more, there are seven (7) slots 172 as shown, viz. thus to provide roller cages 174 at the sides of the pipe (in a horizontal plane), another at the bottom, and others at intermediate points spaced by about 45°. At like localities about 45° above the side roller cages, or conveniently somewhat closer to accommodate further roller means adjacent the top of the pipe, similar slots 172 are provided for identical cages 174, thus completing the described arrangement of seven (7) such cages, it being understood that in some cases an even greater number of such sets of rollers may be employed, circumferentially spaced around the pipe.

The pipe engaging roller means further includes sets of rollers of generally similar purpose at the upper part of the pipe, carried by cages 177, 178 (Figs. 9, 11 and 20), the corresponding rollers themselves being generally designated 179, 180. As previously explained, the pipe blanks are conveniently advanced to the welding chuck with the cleft uppermost, the rollers 179 and 180 being there disposed in close proximity to the cleft.

Since the structures of the several roller cages 174 and associated parts are identical, more particular description of one of them will serve for all.

Referring to Figs. 8, 11, and 13 to 15, the cage 174 comprises a rugged body structure assembled to provide pockets 181 respectively enclosing rollers 182, each mounted for free rotation, upon a non-rotating shaft 184 journalled in bearings within the roller, the rollers projecting somewhat from the pockets toward the pipe blank 44, as shown. The cage 174 is shaped to fit, at its ends, in the slots 172 of the respective plates 165, 166, and has shoulders 187, 188 to abut the inner surfaces of the plates.

For each cage there is a heavy mounting bar 190, substantially coextensive with it and seated, ahead of it, in the corresponding slots 172, the bar 190 being secured to the end plates 165, 166 by brackets 191, 192. Since the force to be exerted by the rollers 182 is essentially only in a direction against the surface of the pipe blank 44, i. e. compressively on the latter, the cages 174 need only to be backed up for transmission of such compressive force between them and the supporting plates 165, 166. To such effect, each bar 190 carries at each end, in threaded engagement, a stud or bolt 194 having a rounded head 195 (Fig. 15) which seats in a correspondingly rounded cavity 196, arranged in the cage 174 and facing outwardly. Thus assuming that the pipe blank 44 is in position in the chuck, the threaded studs or bolts 194 may be turned down, in the retained supporting bars 190, to force the several cages 174 and their associated rollers 182 against the surface of the pipe blank.

To prevent undue loosening of the roller cages when a pipe blank is absent from the chuck, and indeed to prevent the upper cages from falling out at such time, each of the studs 194 has a reduced portion 198 projecting from its rounded head 195 through a passage 199 in the cage block 174, the outer end of the pin being retained in a corresponding recess 200 in the cage 174 by a collar 201 removably held on the end of the pin 198 as by a locking pin 202. The fit of the assembly of the reduced portion 198, and collar 201 in the passage 199 and recess 200 may be relatively loose, so as to prevent interference with natural and ready self-alignment of the rollers and roller cages, the chief function of the described retaining means being simply to prevent displacement of the cages when no pipe is present, rather than to carry any load in operation.

Although other means may be employed for turning up the studs or bolts 194 in their threaded engagement with the bars 190, the drawings illustrate a simple wrench 204 having a hexagonal or like opening 205 to cooperate with a corresponding head 206 on the stud 194. It will be appreciated that for a given run, i. e. with a selected size of pipe blanks, all of the studs are initially adjusted to place the associated sets of rollers in proper position and under the desired high pressure against the pipe surface, viz to cooperate in exact alignment of the pipe blank 44 through the chuck. A separate wrench 204 being provided for each stud, the wrench may simply be left in place. A supplemental screw 208 and washer 209 may be secured in the head 206 of each stud, to prevent inadvertent removal of the wrench 204.

The arrangements of the roller cages 174 thus afford a multiplicity of sets of rollers spaced circumferentially around the pipe blank and each extending in a longitudinal array lengthwise of the path of pipe travel. Preferably each set includes a multiplicity of such rollers, for example five (5) as shown (Figs. 8, 13 and 14), i. e. a substantially greater number than one or two, the linear extent of the array being preferably at least about as great as the diameter of the pipe under production, for effective and positive retention of the blank to attain the improved results herein described.

The further sets of rollers 179, 180 at the top of the assembly, each consist of a multiplicity of such rollers (Figs. 8, 9, 11, 16 and 17) carried by cages 177 and 178, respectively, the sets and their cages being identical except that they are arranged to face in opposite directions. Although the rollers 179 and 180 can be disposed on axes each making less than a right angle to the path of pipe travel so as to tend to urge the cleft edges together, they are arranged in the illustrated apparatus with their axes essentially transverse of the pipe path, i. e. so that they revolve in alignment with such path, in linear tandem relation as shown in the figures mentioned. Referring thus for example to the cage 178, each of the rollers 180 has a shaft 210 extending rearwardly therefrom and carried in ball bearings 212 or the like, mounted in appropriate recesses in the cage member 178. The rollers 179 being similarly mounted, it will be seen that each set of them is carried by a cage wholly at one side, permitting very close disposition of the rollers parallel to the line of the passing pipe cleft 100, for example, not more than an inch or two away from it. At the ends, the cages 177, 178 carry projecting shaft portions 214, 215 for rotatable mounting in corresponding openings as indicated at 216, in Fig. 18, in the end plate structures 165, 166. The shaft portions 214, 215 have extended parts 218, 219 each of which may be splined or keyed to a corresponding crank arm 220, which projects upwardly from the shaft portion 218 (Figs. 9 and 11) and at a remote end has a portion 221 abutted by screws 223 threaded in lugs 224 on the face of a plate 225 which is removably attached to the corresponding end plate, such as the plate 165 in Fig. 11.

There being four (4) such arms 220, i. e. one at each end of the roller cages 177, 178, it will now be seen that by adjustment of the screws 223, of each, the roller cages may be rocked about the axes of their shafts, so as to adjust the rollers 179, 180 radially of the pipe blank, for precise positioning and pressure relation of these sets of rollers, such manner of adjustment being made possible by the eccentric relation of the rollers to the cage shafts. The screws 223 are then locked in desired position of adjustment by appropriate lock nuts 228.

While the shaft ends 214 of the roller cages might simply seat in openings of the plates 165, 166, it has been found advantageous to provide separable plate elements (Fig. 16), identical in each of such main plates, to carry these cages. One of the separable plates 230 is also illustrated in Figs. 18 and 19, comprising a plate-like structure having openings 216 for the corresponding shafts of the two roller cages and having tongued side edges 232 to fit correspondingly grooved edges 234 of a recess or cut-out 236 of the main plate 165. Thus the supplemental plate 230 can be easily slid into position in the main plate (its surfaces being flush with the latter), and is there secured by long bolts 237 extending through it and into the main plate, i. e. parallel to the faces of both. By this structure, the supplemental roller cages 177, 178, with their attached rollers and other associated instrumentalities may be readily removed, without dismantling the entire welding chuck assembly. It may be explained, for example, that by virtue of their proximity to the welding locality and to the heat and other influences of the welding operation, more frequent servicing, replacement, or other attention to the rollers 179, 180 may be necessary than for the rollers 182.

While other specific designs of the top rollers may be employed in some cases, each of the illustrated sets here consists of a large multiplicity of rollers 179 or 180, smaller in size but preferably much greater in number than the other sets of rollers 182. For instance, there may advantageously be at least twice as many rollers for each of the cages 177, 178 as for the cages 174, the illustrated apparatus having fourteen (14) of the small rollers 179, 180 on each side of the pipe cleft, closely spaced and in effect filling the entire length of the chuck, axially along the pipe. By such arrangement, a greatly improved linearity and rigidity of the pipe wall is insured at the very edges of the cleft, not only at the time of the actual weld, but also during subsequent travel of the pipe and indeed until the welded seam has fully solidified and set.

In general, arrays of successive large rollers or like devices, pressing heavily on the pipe wall, may tend to produce a wave-like motion of the latter, which even though small can deleteriously effect the strength and solidity of the welded seam, i. e. to the extent that such wave-like motion permits any relative movement of the edges of the cleft while the weld metal is molten or otherwise incompletely set. By employing, however, a considerable multiplicity of closely successive small rollers 179, 180 along the cleft, it has been found that such wave-like or other mutual displacement of the cleft edges is practically eliminated, permitting attainment of a thoroughly strong and undisturbed seam.

One example of welding instrumentalities (more fully described below) is represented in Fig. 8 by the dotted lines 240, 241 signifying electrode rods or wires for a welding operation of a double arc type. As will be noted, the weld is thus performed at a rearward locality of the chuck assembly, so that a substantial extent, indeed more than half, of the length of the several arrays of rollers is disposed forwardly of the point of weld. The pipe is therefore firmly and positively held, against any lateral motion, particularly against any relative movement of the cleft edges, until full solidification has occurred, the advance of the pipe (leftward as seen in Fig. 8) being conveniently timed so that such set of the seam is completed when it emerges from the lefthand end of the chuck.

Each of the upper roller cages 177, 178 has a central passage 244 extending throughout practically the entire length of its metallic body, i. e. lengthwise of the pipe, such passage having a port 245 (Figs. 16 and 17) through the top of the cage at one end, and having an opening through the shaft structure 215, 219 at the other end, so that with correspondingly attached conduits 246, 247 water or other coolant may be continuously circulated through the passage 244. Since the proximity of the rollers and the cages to the arc welding means at 240, 241 and to the hot, welded seam, tends to heat the assembly, the described circulating systems prevent excessive elevation of the temperature of the roller cages and the rollers, and promote longer life, especially of the latter and their bearings.

As will now be seen, the described elements of the chuck assembly comprise means positively abutting the surface of the pipe in rolling engagement at a great multiplicity of localities distributed both circumferentially and longitudinally thereof, and including special roller arrangements immediately adjacent the cleft path, all elements cooperating for a peculiarly advantageous grip of the traveling pipe, under relatively strong pressure to keep it in the exact desired shape, fully steady, and with the cleft effectively and firmly closed. The complete and extensive embrace of the pipe by the chuck rollers is schematically but comprehensively shown in Fig. 24, it being remembered that all of the illustrated rollers are in contact with the surface of the pipe blank under relatively large pressure, holding it with the utmost rigidity and firmness throughout the longitudinal extent of the chuck. At the same time, all parts are both removably and adjustably mounted, not only to facilitate accurate alignment for operation on a given pipe, but to permit ready re-setting of the equipment for pipe of other diameters. If desired, the substantially cylindrical surfaces of the several rollers, especially the rollers 182, may be slightly contoured to fit the pipe; in some instances, however, such contouring may be omitted or may be of a sufficiently slight extent to permit the several cages 174, 179, 180 to be used for different pipe sizes, i. e. simply by substituting different end plates 165, 166 having correspondingly different dimensions for the several slots and openings in which the cages and their supporting assemblies are seated.

*Flux-confining means*

As indicated above, and further explained below, a suitable welding operation may involve a pair of arc electrodes 240, 241 (Fig. 8) stationed adjacent the path of the cleft 100, for welding the seam as the pipe blank progresses through the chuck. A presently preferred type of welding operation involves the introduction to the face of the weld locality, i. e. just before it reaches the electrodes, of a relatively large quantity of flux material, e. g. finely granular material which is delivered to and flows out upon the surface of the pipe blank 44 from a discharge tube or nozzle 255. A specific example of such flux is a finely granular material having a content of elements or compounds such as iron oxide, manganese dioxide, silica, and others; the material being dry and free-flowing and being preferably laid on the surface of the pipe blank in an elongated pile or heap above the closed cleft, to a height of at least an inch or more (as shown at 256 in Figs. 21 and 24), so that the ends of the electrodes 240, 241 and thus the welding arc itself, are buried in the material.

Flux substances of the stated character have been found to be quite abrasive, and therefore both to protect the aligning and holding rollers 179, 180 and also to afford economy in the use of such flux material, guard means are provided along the path of the pipe cleft and seam through the chuck. For example, such means may comprise a pair of elongated, vertically disposed plates or shields 260, 261 (Figs. 8, 9, 20 and 24), such shields thus separating the rollers 179, 180 from the body of flux material 256, and extending from the forward or outlet end of the chuck, i. e. at the plate 165, to a locality just at the rear of the flux delivery pipe 255. The plates are mounted, for example, from the associated roller cages 177, 178, by suitable means, identical for both and conveniently described in connection with the shield plate 261.

The plate 261 has an upper horizontal flange 262 carrying threaded sockets 263 spaced along it (Fig. 8), each received by a stud or stem 264 which is telescopically enclosed by a tubular support 265 mounted by a bracket 266 on the roller cage 178. The outer surface of the tubular support 265, at its upper part, is threaded to receive a cap 268 through which an upper stem part 269 of the stud 264 is free to slide, the stud 264 being similarly free to slide through the lower part of the tubular member 265. A coil spring 270 is disposed under compression around the stem portion 269 between the undersurface of the cap 268 and a shoulder 272 on the stud 264, so that the stud (and with it, identically arranged studs for the other sockets 263) is urged downwardly by the spring 270. The shield 261 is thus urged toward the surface of the pipe 44, the compression of the springs 270 being adjustable in each case by the threaded cap 268.

While in some instances the lower edge of the shield may be permitted to drag along the surface of the pipe, with the springs affording relief upon irregularities or the like, further means comprising the wing nut 274 mounted on the threaded upper end 275 of each stem portion 269, are preferably provided to limit the downward displacement of the shield 261. Thus the wing nuts 275 may be adjusted so that the lower edge of the shield 261 barely clears or barely touches the surface of the pipe. In such circumstances any large irregularity or upward curvature of the latter is still taken up by the springs 270, without breaking or bending the shields, but at the same time, undesirable scoring or scratching of the pipe surface by the lower edge of the shields is essentially avoided.

For further guarding effect against flying particles of the flux material, e. g. as the latter is rapidly delivered into the space between the shields 260, 261, extension guard plates 280, 281, are also carried by the shield devices respectively extending upward and against the adjacent faces of the roller cages 177, 178. By all of the described instrumentalities, the flux is essentially confined to the region between the shields 260, 261, i. e. as illustrated in Fig. 20; and no more of it need be introduced than to fill the resulting channel to the desired level for the intended, submerged arc operation. Since the shields serve the particularly important function of preventing flux particles to any substantial extent, from escaping laterally, i. e. in the path of the rollers 179, 180, they prevent excessive wear of such rollers, or corresponding scratching of the pipe surface, as might be caused by the abrasive particles. Indeed the rollers 179, 180 have therefore a considerably longer life than might otherwise be possible.

The shield elements 260, 261, 280, 281 are very preferably made of at least a relatively non-magnetic material, such as stainless steel, so that they have no appreciable disturbing influence on the electric arcs at the electrodes 240, 241. That is to say, these arcs carry relatively high currents of the order of 500 to 1000 amperes, and tend to induce strong magnetic fields in any nearby material of susceptible character, which fields in turn are apt to distort or disturb the arcs in an undesirable and erratic manner, with serious impairment of the weld.

*Internal carriage and register means*

Referring particularly to Figs. 1-A, 2-A, 8, 9 and 10, the apparatus also includes further structure, riding the interior of the pipe at the vicinity of the chuck, for cooperating purposes of guiding and alignment, as well as for other significant functions. As shown, such device (generally designated 50a) includes a head or body structure 300 carried at the end of a supporting boom or mandrel pipe arrangement generally designated 301, which extends rearwardly from the carriage and is supported by spaced and aligned plates 303, 304 suspended from the upper part of the frame structure 40, for example at a locality between the pinch rolls 49 and 50, the plates 303 and 304 thus extending as ligaments through the cleft of the passing pipe blank 44, and being sufficiently thin for free passage of the pipe blank along its path (Fig. 29).

While the mandrel or boom structure 301 may consist of a single element, the preferred arrangement shown comprises a short length of heavy pipe 305 extending from the head 300 and a long length of similar pipe 306, overlapping the section 305 as shown and extending axially rearward to the supporting ligaments 303, 304, which are secured to it. A pair of oppositely facing saddles 307, 308 are secured to the respectively adjacent ends of the pipes 305, 306 and separably connected at 308. Thus by disconnecting the saddles, the carriage assembly, with only the short length of pipe 305, may be removed for service, adjustment or indeed replacement of parts to accommodate a different size of pipe blank, without altering the connections of the remaining supporting structure 306, and indeed without requiring access to such connections.

For further rigidity and security of the supported mandrel or boom, a cooperating, connecting member 310 may extend from a locality near the forward end of the pipe 306 to an adjacent part of the plate 117 which supports the lower pinch roll 112. A similarly additional supporting element 312 is secured between the ligament plate 304 and the supporting plate 117a for the lower pinch roll of the set 49. Thus the entire boom structure is rigidly and securely supported inside the passing pipe blanks, and aligned lengthwise thereof to provide corresponding alignment and positioning of the carriage head 300.

Projecting from the sides of the carriage head are a pair of rollers 314, 315, adapted for rolling contact with the inner face of the pipe blank 44 at opposite sides in a central, horizontal plane. The rollers 314, 315 are mounted to rotate freely in bracket bearings 316, 317 secured to the carriage head 300 by spacers 318, 319 respectively, the latter being replaceable as necessary to accommodate the carriage to pipe of different diameter.

The carriage effectively rides on a lower roller 320, of relatively considerable size, which engages the inside bottom surface of the pipe 44 in rolling contact. The roller 320 is preferably carried for free rotation in suitable bearings in a yoke 322. At its upper end (Fig. 8–A) the yoke carries a vertical shaft 324 which is mounted and supported in two sets of roller thrust bearings 325, 326 in such fashion as to prevent vertical displacement of the shaft 324 relative to the carriage head 300 but to permit the yoke 322 and roller 320 to pivot, castor-like, about a vertical axis. Rearwardly from the yoke 322 a rod 328 extends to traverse an eye 329 in a depending arm 330 which is rigidly clamped at 331 to the supporting pipe section 305. The inner surface of the eye 329 is preferably contoured in a toroidal or curved manner, as shown, to permit some angular motion of the rod 328 relative to the support 330, without appreciable play in a vertical direction.

The preferred construction shown also includes a rotatable mounting for the end of the pipe section 305 in the carriage head 300. Thus the end part 322 of the pipe 305 (Figs. 8, 8A and 8B) is mounted in a bearing 334 within the head 300, being held against axial displacement by collars 335, 336 secured on the pipe section 305. It will thus be seen that when a removable pin 340 (hereinbelow described) of Figs. 8–A and 8–B is removed as indicated in Fig. 8, the entire head 300 and associated parts may turn about the axis of the supporting mandrel pipe 305, such axis preferably being identical with the axis of the pipe blank 44 in which the carriage rides. On any such turning, however, the yoke 332 and its roller 320 will correspondingly pivot with its shaft 324, since the remote end of the tail rod 328 is held by the eye 329 against rotary motion around the mandrel pipe 305. By virtue of such angular displacement of the roller 320, its engagement (preferably contoured, as shown) with the internal wall of the pipe 44 is misaligned, causing it to tend to restore itself to true alignment axially of the pipe 44. Such restoring force is necessarily translated into corresponding restoring force to turn the head 300 back to its original position. In consequence, while the carriage and associated parts, including other instrumentalities as described below, are thus adapted to twist slightly about the longitudinal axis of the pipe blank 44, as in relieving response to irregularities of contour or otherwise in the pipe, the described arrangement provides a self-steering function serving to maintain the carriage in essentially true alignment.

It should be understood, nevertheless, that satisfactory operation may in many cases be obtained without the self-steering function, i. e. with the yoke 322 immovably carried by the head 300 and the latter immovably secured on the mandrel pipe 305. Indeed in operation with the structure shown it may sometimes be desirable to prevent the several mutually displaceable functions of the described parts; for that purpose a removable pin 340 (Fig. 8–B) may be passed through appropriate holes in the walls of the head 300, the bearing 334 and the mandrel pipe 305, i. e. so as to lock the latter against rotation relative to the head. Thus with the pin 340 inserted in the described openings indicated at 342 (Figs. 8 and 8–A) the entire assembly is effectively locked, preventing both rotation of the head 300 and pivotal movement of the yoke 322 and roller 320. It will be understood that the apparatus is shown in Figs. 8–A and 8–B with the pin in place; when the hereinabove-described steering function is to be utilized, the pin is removed (Fig. 8), and kept removed, during operation.

The carriage 300 also constitutes means for supporting and guiding a cooling device or chill 344, which may comprise an elongated block of copper or like thermally conductive material seated on the end of a piston rod 346 and retained against lateral swinging by a guide yoke 347 extending forwardly from the piston rod. The piston rod is linked by a lever 348 to an upright support 349 of the carriage 300, and extends into a cylinder 350, where compressed air or other fluid under high pressure exerts force on a suitable piston (not shown) to urge the rod 346 upwardly and press the chill 344 continuously against the underside of the passing pipe blank 44. As shown in Figs. 8, 9 and 10, the chill includes a pair of passages 352 extending lengthwise thereof and connected in a U-shape, for circulation of water or other coolant introduced through suitable conduits at 354. Thus the chill is firmly engaged on the underside of the pipe blank 44, bridging the cleft and extending longitudinally of the pipe in both directions from the locality of arc welding operation indicated at 240, 241 in Fig. 8. It will be understood that the chill co-operates to limit the depth of penetration of the weld and later to effect prompt cooling of the weld.

The carriage 300 also carries an upper roller 360 which engages the inner face of the wall of the pipe blank 44, in rolling contact, at a locality (slightly rearward of the welding point) where a like, upper roller 361 similarly engages the outer face of the pipe wall. That is to say, the rollers 360, 361 are disposed for passage of the pipe wall between them, at the line of the cleft 100, the arrangement preferably providing substantial pressure between these rollers so as to enhance the desired register of the cleft edges which are thereby bridged and engaged.

The lower roller 360 is mounted to rotate in lever arms 363 pivoted at one end to the upright 349 and pivoted at the other end 364 to a piston rod 365, which is urged upward with considerable force by its piston (not shown) in a cylinder 367 actuated by compressed air or other fluid under high pressure. Since the roller 360 is journalled at a locality of the lever arms 363 close to their fulcrum on the support 349 the compressive force exerted by the piston rod 365 is correspondingly amplified. The upper roller 361, which may in one sense be considered as constituting part of the chuck, is rotatably carried by a yoke 368 pivotally mounted to the plate 166 by a bracket 370 and also pivoted to an upper adjusting stud 371 which extends through the plate 166 and which may be axially displaced and locked in adjusted position by nuts 372 threaded on the stud. Thus by shifting the stud 371 in one direction or the other, the position of the roller 368 may be adjusted radially of the pipe blank 44, so that it may back up the lower roller 360 at the desired location of the cleft region of the pipe 44. It may here be noted that the roller 361, and likewise other means such as the aligned rollers 179, 180, are preferably positioned so that they effect a minute depression of the edges of the cleft as the latter traverses the welding chuck, such relation having been found to promote not only strong compressive engagement but maintenance of accurate and uniform alignment, i. e. during the welding operation.

The rollers 360, 361 thus constitute effective register means promoting the desired accurate positioning of the cleft edges, brought closed by the other rollers of the chuck. At the same time, by virtue of the fluid pressure energized force on the under roller 360, the assembly is adapted to yield to any irregularity or unevenness which may inadvertently occur in the passing pipe blank. Similar yield effect, as intimated above, is obtained in the mounting of the chill 344. It may also be noted that the side rollers 314, 315, and the bottom roller 320 all preferably engage the inner wall of the pipe 44 in the same vertical plane as the register rollers, i. e. along a circle around the pipe 44 which passes through the mating region of the rollers 360, 361. The carriage 300, especially at the lower roller 320, not only cooperates with the chuck rollers to steady the pipe 44 as it progresses into the chuck, but effectively backs up the register rollers, in steadying relation. While for some purposes the side rollers 314, 315 may be arranged to engage the inner pipe surface compressively, a presently preferred arrangement is to position or adjust these rollers so that they barely engage the inner pipe surface or indeed have a very slight clearance. Their function then is to cooperate in guiding and aligning the carriage or mandrel assembly, i. e. to keep its heading in the direction of the pipe axis, and not to oppose the compressive strain which the chuck rollers induce in the pipe wall for the purpose of forcing the cleft edges together.

The carriage 300 further serves to mount, i. e. at the sides of the chill 344 and upper roller 360, a pair of sets of elongated wire brushes 380, 381, such wire brushes being mounted on brackets 382, 383, and pressed by the carriage assembly against the inner wall of the pipe 44 along paths parallel to the cleft 100. Conveniently, the brushes may extend forwardly, as indicated by dotted line 381a to a locality ahead of the welding electrodes 240, 241, thereby affording contact with the inner face of the pipe blank 44 over a longitudinally extended region, which also has considerable circumferential extent, as shown in Fig. 9. The brushes 380, 381 serve to make electrical contact with the inner face of the pipe blank 44, for completion of the arc circuits from the electrodes 240, 241. The brushes can be connected directly, through electrical leads (not shown) to the arc circuit via conductors extending, as indicated at 385, along the mandrel pipe assembly 305, 306. The elements 335 may also include appropriate conduits and other controlling cables or connections for the fluid operated cylinders 350, 367, such connections extending, as flattened tubes and electrical conductors respectively, through the cleft in the pipe at a rearward locality, for example as indicated by the dotted lines 386 in Fig. 2-A, the flattened tubes (for chill water circulation and for air under pressure to the cylinders 350, 367) being also shown at 390 in Fig. 29. It will now be seen that as the pipe blank advances past the carrier 300, the brushes 380, 381 sweep firmly across the inner surface of the blank, making effective electrical contact for current flow from the welding arcs.

As indicated above, the described carriage and its associated parts are readily adapted for resetting to accommodate different sizes of pipe, for example in that not only may the rollers 314, 315 be reset as previously explained, but the supporting structure 349 may be replaced by an element of different altitude, and the supports 382, 383 for the brushes similarly replaced. The yoke 322 and its roller 328 can likewise be easily removed, and a yoke and roller of appropriately different size substituted.

As explained, the carriage arrangement serves a plurality of important functions internally of the passing pipe blank, not only to support the chill and the contact brushes, but particularly in steadying the blank internally of the chuck, and in collaboration of and with the register rolls, to promote exact register of the cleft edges as they are brought to the welding locality.

*Arc welding means*

Referring now to Figs. 21 to 23, inclusive, as well as Figs. 8, 10 and 24, the arc welding instrumentalities 54a are generally mounted on the transverse members 161 at the top of the chuck frame 52, so as to dispose the electrode rods 240, 241 in proper position to weld the seam along the cleft 100 in the pipe blank 44. While other welding systems may be employed, the apparatus shown includes, as explained above, an arc arrangement wherein the arc electrodes are submerged in a body of generally loose flux 256 which is continuously deposited on the passing pipe, in covering relation to the cleft, from a feed tube 255. Although for some purposes only a single welding electrode may be employed, and although alternatively several such electrodes, either different or alike in electrical or welding characteristics, may be used, the selected arrangement includes the two electrode rods 240, 241 supplied respectively with direct and alternating current, so that as the pipe 44 advances, any given point of its cleft first passes a D. C. arc from the electrode 240 and then passes an A. C. arc from the electrode 241, each such arc extending between the respective electrode and the pipe 44, the remainder of the circuits being completed through the pipe wall and the brushes 380, 381. Conveniently the A. C. and D. C. returns may be separately directed from the sets of brushes.

For operation of such arcs, the electrode rods 240, 241 are in fact the leading ends of electrode wires continuously supplied from suitable reels (not shown) as the metal of the wires is consumed in the arc welding operation. Thus in Figs. 21 and 22, a pair of supporting rods 400, 401 are mounted on brackets 402, 403 carried on and above the frame members 161, and are aligned axially of the pipe 44. On releasably clamped supports 404, 405, by which preliminary positional adjustment may be made, motor and feeding devices generally designated 406, 407 are mounted. These may be air motor structures of known type, driving rotary feed elements 408, 409 which respectively and continuously advance the electrode wire 240, 241 downwardly from the source (not shown) to the arc locality in suitable conformity with the rapid consumption of the wires in the arcs, such feeding devices themselves being known and per se forming no part of this invention. The devices 406, 407 are electrically insulated from other parts of the apparatus, as by spacers 410, 411 of insulating material, above the supporting brackets 404, 405.

A shelf or table 414 carried, in effect, above and on the frame members 161, is disposed at a locality substantially below the upper mounting bars 400, 401 and in relatively close proximity to the pipe 44, i. e. just above the roller cages 177, 178 and associated devices. Mounted in ways 416 that are carried by the shelf 414, a plate 418 is disposed to slide transversely, i. e. in a horizontal plane across the path of pipe advance. A lead screw 420 threaded into the end of the plate and carrying a sprocket 421 which by a chain 422 is coupled to an upper sprocket 423, effectuates sliding adjustment of the plate 418 in the ways 416, for instance upon rotation of an upper transverse shaft 425 which carries the upper sprocket 423. The shaft 425 is conveniently supported in bearings 426, 427, mounted on the bars 400, 401, and has at its other end a crank or handwheel 428. By this arrangement, an operator standing beside the welding chuck, may turn the crank 428 and thereby adjust the plate 418 in either direction crosswise of the pipe path, without having to reach into the vicinity of the welding operation and without having to touch the welding means.

The plate 418 carries directly a connecting block 430, and indirectly through means described below, a like connecting block 431, the blocks 430, 431 respectively mounting certain further supporting blocks 432, 433. In turn, the blocks 432 and 433 carry copper nozzles 436, 437, which pass essentially vertically through the blocks and communicate respectively with steel tubes 438, 439 that extend upwardly into retaining collars 440, 441 on the corresponding wire feeding assemblies designated 406, 407. The arrangement is thus such that the wire 240, leaving the feeding element 408, passes through the tube 438 and the nozzle 436, while the wire 241, from the element 409, similarly traverses the tube 439 and the nozzle 437. The block elements 430 to 433 inclusive are thus arranged so as to dispose the nozzles 436, 437 to deliver the electrode wires 240, 241 in the desired position adjacent the path of the pipe cleft, viz. with the wires approaching the pipe at localities spaced a short distance (say about 1 inch or so) lengthwise of the cleft.

In consequence, the instrumentalities carried by the shelf 414 provide effective guiding and holding means for the ends of the wires 240, 241, while permitting the desired, continuous feed of such wire from the advancing devices 406, 407. More particularly, the described arrangement, wherein both of the nozzles 436, 437 are in effect mounted on the slide 418, permits the two nozzles and thus the leading ends of the wires 240, 241 to be adjusted with considerable precision transversely of the pipe, by operation of the handle 428.

While both feed nozzles may, if desired, be mounted directly to the plate 418 as in the case of the nozzle 436, means are preferably provided for mutual adjustment of the nozzle positions. To that end, the block 431 is carried on a bracket 445 extending from a slide 446 which is adapted to be adjusted back and forth in ways 447 parallel to the ways 416, as by a lead screw 448 threaded into the slide 446. The ways 447 are in turn mounted upon another slide 450 which is adapted to move in a direction at right angles to the slides 418 and 446, i. e. lengthwise of the pipe 44. That is to say, the member 450 is mounted in ways 452 which are carried on the plate 418, the member 450 being adjusted by a lead screw 454 in the same manner as the slides 418 and 446.

As a result, the position of the nozzle 437, e. g. the local guide device for the A. C. arc, may be independently adjusted both longitudinally of the pipe 44 and crosswise thereof, all relative to the position of the D. C. arc nozzle 436. Ordinarily, it will be found that adjustment, as by the screws 448, 454, of the mutual positions of the arc electrode wires 240, 241 need only be effected at the beginning of a production run, to obtain the desired alignment and optimum positional spacing of the ends of the wires. Thereafter it is commonly necessary to adjust no more than the single plate 450, i. e. as by means of the handle 428, to keep the electrode wires in desired alignment with the cleft 100, e. g. to follow any minor, lateral wandering of the cleft line, say to the extent of a minor fraction of an inch, as may arise through natural irregularities or twisting or distortion effects in the heavy pipe blanks 44 during their passage through the machine. It will be noted that although the steel tubes 438, 439 are relatively rigid, their upper support in the collars 440, 441 may have some looseness or be otherwise arranged to permit angular movement of the tubes for the described adjustment, the tubes themselves having such minor flexibility relative to the blocks 432, 433 as may be supplementarily necessary to accommodate such adjustment.

The blocks 432, 433 and likewise the blocks or members 430, 431, are preferably of non-magnetic but electrically conductive material, such as copper or copper-beryllium; electrical terminals for the arcs can be fastened directly on the respective blocks 430, 431, i. e. as shown at 460, 461, while the non-magnetic character of these elements serves to minimize disturbance of the arcs by magnetic effect. The nozzle supporting means may also be appropriately insulated from the remainder of the apparatus, as by plates or sheets of electrical insulation 462, 463 disposed between the elements 430, 431, and their respective supporting parts 418, 445.

The described arrangements provide effective support of the welding instrumentalities, including the wire feeding means, above the chuck device at 52, while at the same time afford peculiarly efficient guiding and holding means for the electrode wires, with convenient provision for the adjustment of the position of the latter, e. g. to maintain exact alignment with the cleft 100.

In normal operation of the illustrated types of arc, the portion of the flux body 256 immediately adjacent the cleft 100 and the welded seam 470 is fused or sintered in the form of a heavy bead removably encrusted above the welded seam. A major part of the mass of flux particles, however, remains unaffected, and hence may be withdrawn by a vacuum cleaning device 472, constituting a pipe which opens adjacent the seam at a locality forward of the chuck, so that suction in the pipe may carry the surplus, loose flux material away for re-use.

General Operation

The operation of the complete apparatus should now be essentially manifest from the description of the several elements hereinabove. Referring to Figs. 1–A and B, 2–A and B, and especially schematic views such as Fig. 24 and also Figs. 25 to 27, the successive, long lengths of large diameter pipe blank or tubular structure are introduced along the under rollers, first by hand or other means not shown, and then preferably, at the entrance to the apparatus, by the pusher means 46. Advanced thereby to the first of the array of pinch rolls 48, 49, 50, the pipe blank is guided and further advanced by the last-mentioned rolls. The cleft, disposed conveniently at the uper side of the pipe blank, is aligned with the welding instrumentalities and is simultaneously guided to a closed relation. It may be noted that in general the pipe blanks as introduced may have the cleft slightly open, but not more than about an inch, or more usually much less, as is intended to be indicated by the blank 44b in Fig. 28. Indeed the fin 110b of the upper member of the first set of pinch rolls 48, may more often than not be required to open the cleft somewhat, as it traverses these rolls.

As explained, the pinch rolls 48, 49, 50 steady and align the pipe and serve the important and further function of driving the pipe blank through the chuck device at 52. In the latter instrumentality, the multiplicity of rollers spaced both circumferentially and longitudinally of the blank exerts strong pressure on it from all directions, bringing the cleft squarely closed and aligning and holding the latter steady for the welding operation by the electrodes 240, 241. The specific sets of rollers 179, 180 function to steady the immediate edges of the cleft, while the register rolls 360, 361 promote maintenance of squarely closed condition as the cleft advances past the arc electrodes. Conveniently adjusted and controlled, as by means shown in Figs. 21 to 23, the electrodes weld a secure seam along the cleft in the continuously passing pipe blank, the electrodes in effect plowing beneath the surface of the flux material 256 which is confined by the guards 260, 261.

The chuck structure including the rollers 179, 180, keeps the freshly welded seam wholly steady, particularly against relative motion of the cleft edges, until the molten metal is fully solidified, the length of the chuck along the pipe path and the rate of pipe advance being coordinated to insure such completion of the seam before it emerges from the forward face 165 of the chuck. Simply by way of example, with instrumentalities of the character described, eminently satisfactory seams and correspondingly satisfactory pipe have been made, with pipe blanks having diameters of 24 inches to 30 inches, by operating the apparatus at a speed of 40 to 60 inches per minute, i. e. the rolls 48, 49, 50 being driven to advance the pipe blanks continuously at such speed.

As also explained above, the instrumentalities associated with the carriage 56a cooperate in alignment and other functions as the pipe blank passes the welding station. As a result of the successive operations, welded pipe is continuously delivered from the forward end of the chuck, for such further finishing treatment as may be desired, for example, including in some cases, provision for executing a welding operation along the inside of the pipe, i. e. the inside edges of the cleft, when such further step is found necessary for desired, high strength of the pipe. Although such further welding means form no part of the present invention, it may be explained that by virtue of the strong welded seam produced in the illustrated apparatus, special guiding and pressure-supporting means are generally unnecessary in such equipment, since the pipe then essentially maintains its desired shape without supplemental aid.

The complete apparatus, throughout its parts, primarily automatic and continuous in operation, is both rugged and efficient, and is readily adapted for resetting to accommodate different diameters of pipe, such resetting including replacement of various rolls, such as the rolls 48 to 50, which are contoured for a specific pipe diameter. In use the apparatus has been found to require remarkably little service or repair, while the essentially automatic nature of the several elements minimizes the need for continuous, expert attention by operating personnel.

It is to be understood that the invention is not limited to the specific embodiments herein shown and described, but may be carried out in other ways without departure from its spirit.

We claim:

1. In apparatus for advancing a pipe blank of large diameter and having a longitudinal cleft, in combination, a roll contoured for rolling engagement with the outer surface of the pipe and spanning the cleft, a roll contoured for rolling engagement with a corresponding part of the inner surface of the pipe, a cleft-penetrating fin carried by one of said rolls, and adapted to keep the pipe cleft open to the width of the fin, the other of the rolls having an annular slot to accommodate the fin, means for driving at least one of said rolls to advance the pipe axially, means extending through the cleft for supporting the internal roll in the aforesaid rolling engagement, and controlled pressure means embodied with the supporting means to hold the inner roll in strong compressive engagement with the pipe blank and thereby to hold the margins of the blank adjacent the cleft in strong compressive engagement with the external roll, to cooperate therewith in driving both margins of the pipe blank concurrently.

2. In apparatus for advancing a pipe blank of large diameter and having a longitudinal cleft, in combination, a roll contoured for rolling engagement with the outer surface of the pipe and spanning the cleft, a roll contoured for rolling engagement with a corresponding part of the inner surface of the pipe, a cleft-penetrating fin carried by one of said rolls, and adapted to keep the pipe cleft open to the width of the fin, the other of the rolls having an annular slot to accommodate the fin, means for driving the outer roll to advance the pipe axially, and means extending through the cleft to support the internal roll in the aforesaid rolling engagement, said rolls being concentrically contoured and being mounted in compressive relation to each other, for concurrently advancing and conforming both edges of the cleft.

3. In apparatus for advancing a pipe blank of large diameter and having a longitudinal cleft, in combination, a concave roll contoured for rolling engagement with a part of the exterior circumference of the pipe and spanning the cleft, a convex roll contoured for rolling engagement with a corresponding part of the interior surface of the pipe, a cleft-penetrating, thin fin carried by one of said rolls, and adapted to keep the pipe cleft open to the width of the fin, the other of the rolls having an annular slot to accommodate the fin, means for driving the concave external roll to advance the pipe axially, ligament means extending through the cleft at localities immediately adjacent the rolls in both directions along the pipe to support the convex internal roll in the aforesaid rolling engagement, and spring means carrying the ligament means to hold the inner roll in strong compressive engagement with the pipe blank and thereby to hold the margins of the blank adjacent the cleft in strong compressive engagement with the external roll, to cooperate therewith in driving both margins of the pipe blank concurrently.

4. In pipe manufacturing apparatus wherein a pipe blank of large diameter and having an axial cleft is to be advanced to means for producing a joint along said cleft, in combination, a plurality of sets of roller means disposed along the path of pipe blank advance and spanning the cleft and arranged to engage the pipe blank to guide the travel of the same in a predetermined direction and position, each set of roller means including guide structure penetrating the cleft for aligning the latter in the aforesaid predetermined direction, and means for driving the sets of roller means in unison to advance concurrently both margins of the pipe blank adjacent the cleft to the seam-producing means, each set of roller means including a roll disposed internally of the pipe and means projecting through the cleft for supporting said internal roll in rolling engagement with the inner surface of the pipe blank, each set of roller means comprising a pair of pipe-conforming contoured pinch rollers respectively outside and inside the same portion of the pipe wall, on parallel axes, and each guide structure comprising a fin on one of the rollers of the corresponding set, the other roller of the set having an annular slot to accommodate the fin.

5. In pipe manufacturing apparatus wherein pipe blanks of predetermined length, having an axial cleft, are to be longitudinally advanced in succession past a device for producing a welded seam along said cleft, in combination, first, second and third pinch roller means for compressively engaging and conforming the pipe blank, and chuck means, disposed in spaced relation in series in the order named along the path of pipe advance, and means for driving said pinch roller means in unison to advance the pipe blanks, said chuck means being disposed adjacent the seam-producing device and being adapted to hold the cleft in tightly closed relation for operation of said device, each of said pinch roller means having associated cleft-penetrating guide structure, each of said pinch roller means comprising contoured pipe-wall-engaging rollers rsepectively inside and outside the pipe wall on parallel axes and each guide structure being a fin carried by one of the rollers, the other roller of each set having an annular slot to accommodate the fin, said guide structures being aligned to align the cleft with the seam-producing device and being respectively graduated in size, becoming narrower in the above-named order, said roller means each engaging a substantial portion of the pipe blank periphery on both sides of the cleft to hold the same with the width of the cleft opening in correspondence with the associated guide structure, so that said roller means and structures cooperate to drive the marginal edges of the pipe blank positively along converging paths to the aforesaid closed relation in the chuck means, said sets of pinch roller means serving to drive successive pipe blanks into and through the chuck, said four means being spaced relative to each other with the distance between the third pinch roller means and the leaving end of the chuck means less than one-half the length of the pipe blanks so that after the leading edge of a pipe blank has passed the second of the roller means, the blank is always engaged by at least two of said four means until at least half the length of the blank has passed beyond the chuck means with the seam therein completed.

6. In apparatus for advancing large diameter pipe having an axial cleft past a locality for welding a seam in said cleft, in combination, chuck means adapted to embrace the pipe blank and comprising a multiplicity of rollers disposed in firmly compressive rolling engagement with the blank to hold the cleft thereof firmly closed, and distributed both circumferentially and longitudinally of the pipe blank, at least several guiding, cleft-fin-carrying sets of contoured pinch rolls spaced along the path of the blank to the chuck and engaging the wall of the blank from both surfaces, and including means for driving said sets in unison, for positively advancing a pipe blank to and through the chuck means while guiding its cleft toward closed position, each set of pinch rolls comprising a pair of pipe-contoured rolls respectively inside and outside the pipe blank on parallel axes for compressively engaging a portion of the pipe wall between them, a carriage disposed internally of the pipe blank at the chuck means, having means extending out of the pipe blank to support said carriage and having circumferentially spaced guiding rollers for guiding the carriage relative to the inside surface of the blank, and cleft register means comprising opposed rollers each disposed in flatwise bridging relation to the cleft and carried respectively by the chuck means and the carriage within the chuck means near the pipe-entering end thereof and having means associated with at least one of said roller means to force it against the other with the pipe wall between, for compressively holding the cleft edges in edgewise registration as they are guided in closed relation into the chuck means by cooperating rolls and rollers of said pinch rolls, chuck means and carriage, said chuck means including means disposed between the register means and the further end of the chuck means, for welding the closed edges of the cleft in the pipe blank advancing through the chuck means.

7. The apparatus of claim 6 which includes ligament means projecting through the cleft of the blank for supporting the internal rolls of the sets of pinch rolls, the aforesaid carriage supporting means comprising an elongated member extending axially within the advancing pipe and secured to said ligament means, which thereby at least in part constitutes a portion of said carriage supporting means.

8. The apparatus of claim 6 which includes stationary supporting structure and in which that roll of each pinch roll set which is external of the pipe blank is carried by said supporting structure, the internal roll of each pinch roll set having ligament means projecting through the cleft of the pipe blank to support said internal roll, said ligament means being spring-mounted to said supporting structure to hold the internal rolls in strong but yieldable, compressive engagement against the external rolls, with the pipe blank between.

9. In pipe manufacturing apparatus wherein a seam is to be welded along an axial cleft in a pipe blank of large diameter, seam welding means adapted to weld the cleft as the pipe blank is advanced axially past said welding means, and chuck means for holding and guiding the pipe as it advances past the welding means, said chuck means including two coextensive sets of tandem rollers respectively disposed to engage the external surface of the advancing pipe blank, along the sides of the cleft therein, each set of rollers comprising a multiplicity of rollers having a diameter substantially smaller than the pipe blank and disposed in rolling engagement with the surface of the advancing pipe blank and arranged in a linear array close to the cleft in the blank and parallel thereto, the spacing between the rollers of each set being only slightly greater than the roller diameter, so that the blank is engaged at a multiplicity of closely spaced points by the rollers, the aforesaid welding means being disposed between the sets of rollers and each array of rollers extending for a distance along the path of the pipe blank which is greater than the diameter of the blank, the major part of the length of each array of rollers being disposed beyond the welding means in the direction of travel of the pipe blank, to hold the latter after the weld has been made, said chuck means also including a multiplicity of other sets of rollers engaging the external surface of the blank, said other sets of rollers being distributed circumferentially around the pipe blank, each of said other sets of rollers being substantially coextensive, longitudinally of the pipe path, with the two first-mentioned sets of rollers, and each of said other sets of rollers comprising at least several rollers distributed along the pipe path, all of the rollers of said first two sets and said other sets being arranged to engage the pipe blank compressively to hold the cleft thereof tightly closed.

10. In a chuck for receiving and holding a pipe blank having an axial cleft, during axial travel of said blank through the chuck, in combination, roller means disposed to engage the periphery of the pipe blank at circumferentially spaced localities, and a set of rollers disposed in a linear array for engagement with the surface of the pipe along a region immediately adjacent and parallel to said cleft, a cage for holding said set of rollers and adjustable mounting means for said cage so that the set of rollers, independently of all other roller means, may be adjusted radially of the pipe blank, each of the rollers of said set having a shaft extending from one side thereof and the cage for said set comprising bearing means respectively receiving the shafts of the rollers, the cage being disposed at one side of all of the rollers of said set, and separated by the rollers from the region to be traversed by the cleft in the pipe blank.

11. A chuck as described in claim 10, wherein the mounting means for the roller cage includes means mounting the cage to pivot about an axis parallel to the axis of the pipe blank, arm means extending radially from the cage, and means for adjustably engaging the arm means, to hold the cage in a desired position of adjustment about its axis.

12. A chuck for receiving a pipe length in compressive engagement as the said pipe length travels axially through the chuck, comprising in combination, a frame, a pair of end plates removably secured at opposite ends of the frame, each of said end plates having a central aperture for passage of the pipe length in a direction perpendicular to said plates, and a multiplicity of roller cage-receiving openings spaced peripherally about said pipe-receiving opening in each plate, and a multiplicity of roller cages respectively carried in said openings, each of said roller cages carrying at least several rollers in longitudinal array for engaging the surface of a pipe length traversing the plates.

13. A chuck as described in claim 12, for engagement with a pipe length having an axial cleft, wherein each end plate has a recess at one side of the central opening, for removing a plate section, said recesses in the end plates being aligned with each other axially of the pipe, said chuck including plate sections removably seated in said openings, and said multiplicity of roller cages including a pair of said cages carried in said plate sections, said chuck being adapted to receive said pipe with the cleft in the vicinity of said removable plate sections, the roller cages carried by said sections being disposed longitudinally of the pipe blank on respectively opposite sides of the path of the cleft, and the rollers of said cages being arranged to engage the surface of the pipe blank in a linear array closely adjacent the cleft on each side thereof.

14. A chuck as described in claim 12, wherein the roller cage-receiving openings are recesses in each end plate projecting radially from the pipe-traversed opening, to receive an end of a roller cage, and wherein the chuck includes backing means extending between the plates and secured thereto radially outside of the roller cages, and means supported by the backing means and engaging the roller cages, for compressively forcing the rollers thereof against the surface of the passing pipe, and wherein the backing means comprises a plurality of supporting bars corresponding to the roller cages, each of the recesses in the plates extending radially from the pipe to receive an end of a supporting bar in a position radially more remote from the pipe than the associated roller cage, and means threaded through the end of each supporting bar and engaging the end of the corresponding roller cage, for adjustably backing the roller cage, to hold the rollers thereof in compressive engagement against the surface of the pipe.

15. A chuck as described in claim 14, wherein each threaded means comprises a bolt having a rounded head, a rounded socket in the adjacent end of the corresponding roller cage engaged by said head, said cage having an aperture extending from said socket, and a projecting, headed element associated with the bolt and loosely seated in said aperture, for retaining the roller cage in place when no pipe length is in the chuck.

16. In pipe handling apparatus, in combination, pipe supporting means adapted for disposition internally of an axially advanced pipe length, said supporting means comprising a carriage, a plurality of roller means mounted on said carriage in circumferentially spaced relation about it and adapted for rolling engagement with the inner surface of the pipe, said mounting means for one of said roller means including fluid pressure actuated motor means effective when supplied with fluid under pressure to maintain said one roller means yieldably in compressive engagement against the inner pipe surface, a long supporting member extending axially of the pipe from the carriage, means extending into the pipe and engaging said supporting member, for holding the carriage in desired alignment in the pipe and means including a conduit extending into the pipe adjacent said supporting member engaging means and extending along said supporting member to said motor means to supply said motor means with fluid under pressure.

17. In pipe manufacturing apparatus wherein a pipe blank having an axial cleft is advanced past means for welding said cleft, in combination, carriage means disposed internally of the passing blank at the vicinity of said welding means, said carriage means including means engaging the blank internally adjacent the welding region, and roller means for holding said carriage means relative to the inner wall of the pipe, a supporting member extending from an end of said carriage means axially of the pipe, means mounting said supporting member at a locality spaced from the carriage, said carriage being mounted to turn about the axis of said supporting member, relative to the latter, and said roller means being mounted to pivot relative to the carriage about an axis transverse of the pipe axis, and means linking said roller means and said supporting member for guiding the carriage to resume a predetermined direction relative to the axis of the pipe in correction of any tendency of said carriage member, and means carried by said supportriage to depart from said direction.

18. The apparatus of claim 17, wherein said linking means comprises a member carried with said roller means and extending axially of the pipe therefrom into the vicinity of said supporting member and receiving said last-mentioned member in universally movable engagement, permitting said last-mentioned member to rock and slide in said receiving means.

19. Apparatus as described in claim 17, which includes means removably engageable between the supporting member and the carriage for preventing relative pivotal motion of the same and for thereby locking the roller means against pivotal displacement relative to the carriage.

20. In pipe manufacturing apparatus, in combination, chuck means for guiding and laterally holding a pipe blank as the same is advanced axially past a welding station to weld a seam along an axial cleft in the said blank, said chuck means comprising a multiplicity of circumferentially and longitudinally distributed roller means compressively engaging the exterior of the pipe blank to hold the cleft closed, with its edges butted, for the welding operation, and register means for promoting predetermined positioning of the cleft edges at the welding station, said register means comprising roller means disposed in rolling engagement with the outer surface of the pipe at a locality near the welding station, said roller means comprising a roller engaging said surface at the path of the cleft and in a flatwise bridging relation to the closed cleft carrier means extending internally of the pipe blank, roller means disposed internally of the blank and comprising a roller in position for rolling engagement with the inner surface of said blank in flatwise bridging relation to the closed cleft and correspondingly in registration with the first-mentioned roller means so that the closed edges of the cleft in the advancing blank are together passed between said roller means, and mounting means on said carrier for the second-mentioned roller means urging the same under pressure against the inner surface of the pipe blank and thereby against the first-mentioned roller means.

21. In pipe manufacturing apparatus, in combination, chuck means for guiding and laterally holding a pipe blank which is axially advanced through said chuck means, said blank having a longitudinal cleft to be closed, and welding means associated with said chuck means for welding a seam along said cleft, said welding means comprising wire advancing means for continuously advancing electrode wire toward the cleft, means mounting said advancing means at a locality spaced above the chuck means, an electrode wire nozzle for guiding the electrode wire intermediate the wire-advancing means and the path of the cleft in the pipe blank, and means movable transversely of the path of the blank for supporting said nozzle in close proximity to the path of said cleft, said nozzle being thereby adjustable, by displacement of said movable means, so that the cleft-adjacent end of the electrode wire may be kept in a predetermined registration with the cleft in the pipe blank, said movable means comprising a slide, having ways mounting the slide to move transversely of the path of the pipe blank, and lead screw means for displacing the slide to adjust the nozzle transversely of the pipe blank, said apparatus including a shaft, handle means for turning the same, and coupling means extending from said shaft to said lead screw, for transmitting rotary motion to the lead screw to effect displacement of the movable means by manual operation of the handle means.

22. In a method of manufacturing large diameter pipe from pipe blanks consisting of long skelp sections cylindrically shaped to a large diameter and having a nearly closed axial cleft, comprising advancing successive pipe blanks longitudinally along a predetermined path in endwise abutted relation, by pinching, rolling, positive driving engagement with the marginal edges of the pipe blanks adjacent the cleft, said pinching engagement of the pipe blanks being effected at a plurality of localities spaced along the path and being accompanied by compressing the edges of the cleft against successively thinner, cleft-penetrating guide supports, to align the cleft in said path while bringing the cleft edges together as each pipe blank advances, said blanks being advanced through a further region while there compressively holding each blank against lateral displacement by rolling engagement with the outer surface of the blank at a large multiplicity of places distributed both circumferentially and longitudinally of the blank, said compressive rolling engagement of the blank maintaining the cleft edges together in firm abutment, and said procedure including continuously arc welding the seam along the closed cleft while the blank is subjected to the aforesaid compressive rolling engagement and while rolling pressure is exerted throughout a distance longer than the diameter of the blank, at a multiplicity of localities closely aligned along each side of the cleft, said first-mentioned pinching, rolling engagement with successive blanks providing the sole driving force exerted on the blanks for pushing the same longitudinally and in endwise abutment through the region of the aforesaid compressive rolling engagement and welding operation on the closed cleft.

23. In apparatus for advancing a generally cylindrical pipe blank of large diameter and having a longitudinal cleft, in combination, an external concave roll, means including a stationary frame supporting said roll for rolling engagement with the outer surface of the pipe blank and spanning said cleft, an internal convex roll, means extending through the cleft and supporting the internal roll for rolling engagement with the inner surface of the pipe blank opposite said external roll and spanning the cleft, a cleft-penetrating fin carried by and projecting from one of said rolls adjacent its center and adapted to keep the pipe cleft open to the width of the fin, said fin projecting from said one roll a distance substantially greater than the thickness of the pipe blank so that the fin projects completely through the cleft when said one roll is engaging a pipe blank, the other of said rolls having a slot deeper than and aligned with the portion of the fin projecting through the cleft to receive said projecting fin portion without engaging its periphery, said rolls being contoured to engage a substantial portion of the pipe blank periphery on both sides of the cleft and to hold the cleft edges against the fin, said contoured rolls and said fin and slot cooperating to guide said blank along a predetermined path with its cleft in a predetermined position and open to a predetermined width.

24. In apparatus for advancing a generally cylindrical pipe blank of large diameter and having a longitudinal cleft, in combination, an external concave roll, means including a stationary frame supporting said roll for rolling engagement with the outer surface of the pipe blank and spanning said cleft, an internal convex roll, spring means supported on said frame, ligament means supported on said spring means and extending through the cleft and supporting the internal roll for rolling engagement with the inner surface of the pipe blank opposite said external roll and spanning the cleft, said spring means being effective to hold the internal roll in yielding engagement with the margins of the blank on both sides of the cleft and to bias both margins of the blank into engagement with the external roll, and means for driving said external roll and thereby advancing both margins of the blank concurrently.

25. Apparatus as defined in claim 24 for advancing a pipe blank of substantial diameter, including a cleft-penetrating fin carried by and projecting from the external roll and adapted to keep the pipe cleft open to the width of the fin, said fin projecting from said external roll a distance substantially greater than the thickness of the pipe blank so that the fin projects completely through the cleft when said external roll is engaging a pipe blank, the internal roll having a slot deeper than and aligned with the portion of the fin projecting through the cleft to receive said projecting fin portion without engaging its periphery, said rolls being contoured to engage a substantial portion of the pipe blank periphery on both sides of the cleft and to hold the cleft edges against the fin, said contoured rolls and said fin and slot cooperating to guide and drive said blank along a predetermined path with its cleft in a predetermined position and open to a predetermined width.

26. In apparatus for advancing a generally cylindrical pipe blank of large diameter and having a longitudinal cleft, in combination, an external concave roll, means including a stationary frame supporting said roll for rolling engagement with the outer surface of the pipe blank and spanning said cleft, an internal convex roll, spring means supported on said frame, and ligament means supported on said spring means and extending through the cleft and supporting the internal roll for rolling engagement with the inner surface of the pipe blank and spanning the cleft, said spring means being effective to hold the internal roll in yielding engagement with both margins of the blank and to bias both margins of the blank into engagement with the external roll, said spring means and said internal and external rolls cooperating to cause concurrent advancing movement of both margins of the blank.

27. Apparatus as defined in claim 26, for advancing a pipe blank wherein said frame comprises a transverse frame member above and spanning the path of said blank and extending longitudinally beyond said external roll in both directions; said spring means comprises a pair of coil springs supported on said frame member on longitudinally opposite sides of said external roll; and said ligament means comprises a pair of mounting studs supported on and extending vertically through said coil springs and aligned apertures in said frame member, and a ligament plate attached to said studs below said frame member, extending through said cleft, spanning said external roll longitudinally, and rotatably supporting said internal roll.

28. In apparatus for advancing a generally cylindrical pipe blank of substantial diameter and having a longitudinal cleft, in combination, three sets of pinch rolls, each set comprising an external concave roll, means including a stationary frame supporting said roll for rolling engagement with the outer surface of the pipe blank and spanning said cleft, an internal convex roll, means extending through the cleft and supporting the internal roll for rolling engagement with the inner surface of the pipe blank opposite said external roll and spanning the cleft, spring means biasing one roll strongly toward the other roll, a cleft-penetrating fin carried by and projecting from one of said rolls and adapted to keep the pipe cleft open to the width of the fin, said fin projecting from said one roll a distance substantially greater than the thickness of the pipe blank so that the fin projects completely through the cleft when said one roll is engaging a pipe blank, the other of said rolls having a slot deeper than and aligned with the portion of the fin projecting through the cleft to receive said projecting fin portion without engaging its periphery, said rolls being contoured to engage a substantial portion of the pipe blank periphery on both sides of the cleft and to hold the cleft edges against the fin; said sets of pinch rolls being spaced along the path of the pipe blank and having fins progressively thinner in the direction of pipe advance, and means driving the external rolls of the three sets concurrently, said rolls cooperating to drive both marginal edges of the pipe blank positively along converging paths.

29. In apparatus for welding an axial cleft in a large diameter, generally cylindrical pipe blank, in combination, stationary welding means, means defining a path for said pipe blank including a chuck supporting said welding means and adapted to guide said blank along a portion of the path adjacent said welding means with the axial cleft of the blank aligned with the welding means, said chuck comprising a multiplicity of rollers adapted to firmly, compressively and rollingly engage the margins of the blank closely adjacent the opposite sides of the cleft to hold it firmly closed, said rollers being distributed longitudinally substantial distances both in advance of and in the rear of said welding means, so that the cleft is held together firmly for a substantial distance before it reaches the welding means and for a substantial distance after it leaves the welding means, and driving means spaced longitudinally of said path, ahead of the chuck and adapted to engage drivingly both margins of the blank adjacent said cleft, so that both margins of the blank are advanced concurrently through the chuck means, all the rollers in said chuck means being independently journaled for free rotation therein, so that no driving force is applied to any part of the blank during its passage through the chuck.

30. In apparatus for advancing large diameter pipe having an axial cleft past a locality for welding a seam in said cleft, in combination, chuck means adapted to embrace the pipe and blank and comprising a multiplicity of rollers disposed in firmly compressive rolling engagement with the blank closely adjacent the opposite sides of the cleft to hold the cleft firmly closed, at least several guiding, cleft-fin-carrying sets of contoured pinch rolls spaced along the path of the blank to the chuck and engaging the wall of the blank adjacent its marginal edges from both surfaces and including means for driving said sets in unison, for positively advancing both marginal edges of the pipe blank concurrently to and through the chuck means while guiding its cleft toward closed position, each set of pinch rolls comprising a pair of pipe-contoured rolls respectively inside and outside the pipe blank on parallel axes for compressively engaging a portion of the pipe wall between them, said chuck means including means for welding the closed edges of the cleft in the pipe blank advancing through the chuck means.

31. Apparatus for advancing large diameter pipe as defined in claim 30, including in said chuck means an external cleft register roller disposed in flatwise bridging relation to the cleft near the pipe-entering end of the chuck means, means associated with said register roller to force it against the margins of the pipe blank, said register roller and said multiplicity of rollers cooperating to hold the cleft edges in edgewise registration as they are guided in closed relation into the chuck means by the cooperating rolls and rollers of said pinch rolls and chuck means, said chuck means including means disposed between the register means and the further end of the chuck means, for welding the closed edges of the cleft in the pipe blank advancing through the chuck means.

32. In apparatus for welding an axial cleft in a large diameter, generally cylindrical pipe blank, in combination, stationary welding means, means defining a path for said pipe blank including a chuck supporting said welding means and adapted to guide said blank along a portion of the path adjacent said welding means with the axial cleft of the blank aligned with the welding means, said chuck comprising a multiplicity of sets of rollers, each set comprising a cage extending longitudinally of the path of the blank and a multiplicity of rollers journaled in the cage in tandem along said path, and means supporting said cages in circumferentially spaced positions about the axis of said path, said cages being spaced radially from the axis so that the rollers firmly and compressively engage a blank passing along said path, said supporting means including means to adjust each cage radially of said path so that said rollers may be made to engage firmly and compressively blanks of different diameters.

33. In pipe manufacturing apparatus, in combination, chuck means for guiding and laterally holding a generally cylindrical, large diameter pipe blank as the same is advanced axially past a welding station to weld a seam along an axial cleft in the said blank, said chuck means comprising a multiplicity of circumferentially and longitudinally distributed roller means compressively engaging the exterior of the pipe blank to hold the cleft closed, with its edges butted, for the welding operation, and register means for promoting predetermined positioning of the cleft edges at the welding station, said register means comprising a roller disposed in rolling engagement with the outer surface of the pipe at a locality near the welding station, means supporting said roller in position to span the closed cleft in flatwise bridging relation to the latter and to press said cleft radially inwardly of the blank so that the blank is slightly flattened adjacent the cleft, carrier means extending internally of the pipe blank, a roller disposed internally of the blank in position flatwise bridging the cleft for rolling engagement with the inner surface of said blank in registration with the first-mentioned roller so that the opposite edges of the closed cleft in the advancing blank are concurrently passed between said rollers, mounting means on said carrier for the second-mentioned roller for holding the same against the inner surface of the pipe blank and thereby against the first-mentioned roller, and means for exerting pressure on said internal roller toward the outer roller for compressive engagement of the pipe wall between them.

34. In pipe manufacturing apparatus, in combination, means defining a path for longitudinal movement of a generally cylindrical pipe blank of large diameter and having a longitudinal cleft, means operable to advance a pipe blank along said path; welding means positioned adjacent the path and including a welding electrode, means operable to deposit granular welding flux material on the blank before it reaches the electrode, and means for removing excess flux from the blank after it passes the electrode; a chuck supporting said welding means and adapted to guide the blank along a portion of said path adjacent the welding means with the sides of the cleft firmly closed and with the cleft aligned with the welding means, said chuck comprising two sets of rollers, each set including a multiplicity of tandem rollers close to the opposite sides of the cleft edge, a pair of shield plates, one between each set of rollers and the cleft, means supporting the shield plates including spring means biasing them towards the blank and means limiting the movement of the shield plates by the spring means to positions in which the plates just clear the blank, so that the shield plates confine the flux material and keep it away from the rollers, but are not subject to deforming forces due to engagement with irregularities in the blank.

35. Pipe manufacturing apparatus as defined in claim 34 including a supporting cage for each set of rollers, stub shafts projecting from the cage toward the cleft and rotatably supporting the rollers, and an extension on each shield plate overlying its associated rollers and yieldingly engaging the cage, said extension being effective to protect said rollers and shafts against entry of flux material particles from above.

36. In apparatus for advancing a generally cylindrical pipe blank of large diameter and having a longitudinal cleft, in combination, an external concave roll, means including a stationary frame supporting said roll for rolling engagement with the outer surface of the pipe blank and spanning said cleft, an internal convex roll, means extending through the cleft and supporting the internal roll for rolling engagement with the inner surface of the pipe blank opposite said external roll and spanning the cleft, said rolls having concentric pipe-blank-engaging elements effective to determine the radius of curvature of a pipe blank passing between the rolls, a cleft-penetrating fin carried by and projecting from one roll adjacent its center, said fin projecting a distance substantially greater than the pipe blank thickness, the other roll having a slot deeper than and aligned with the projecting portion of the fin, and two additional external rolls engaging the pipe blank at points spaced angularly around the periphery thereof substantially 90° from the cleft, said additional rolls being supported on said frame to exert pressure against the blank and force the sides of the cleft against the fin, all said rolls and said fin cooperating to determine the width of the cleft and to maintain the sides of the cleft in radial alignment.

FREDERIC M. DARNER.
WALTER J. CAINE.

References Cited in the file of this patent

UNITED STATES PATENTS

| Number | Name | Date |
|---|---|---|
| 1,415,848 | White | May 9, 1922 |
| 1,679,041 | Leeper | July 31, 1928 |
| 1,806,954 | Schmitz, Jr. | May 26, 1931 |
| 1,893,926 | Anderson | Jan. 10, 1933 |
| 1,906,987 | McDougall | May 2, 1933 |
| 1,983,930 | Carlsen | Dec. 11, 1934 |
| 2,047,254 | Burnish | July 14, 1936 |
| 2,052,380 | Chapman | Aug. 25, 1936 |
| 2,061,671 | Riemenschneider | Nov. 24, 1936 |
| 2,064,035 | Shippy | Dec. 15, 1936 |
| 2,139,211 | Sessions | Dec. 6, 1938 |
| 2,139,771 | Riemenschneider | Dec. 13, 1938 |
| 2,189,399 | Lewbers | Feb. 6, 1940 |
| 2,265,129 | Darner | Dec. 9, 1941 |
| 2,268,368 | Anderson | Dec. 30, 1941 |
| 2,282,032 | Catlett | May 5, 1942 |
| 2,489,002 | Babbitt | Nov. 22, 1949 |
| 2,495,544 | Peterson et al. | Jan. 24, 1950 |
| 2,549,173 | Cogan | Apr. 17, 1951 |